US012764565B2

(12) United States Patent
Yerramalli et al.

(10) Patent No.: US 12,764,565 B2
(45) Date of Patent: Oct. 13, 2026

(54) TECHNIQUES FOR INDICATING SIGNAL PROCESSING PROCEDURES FOR NETWORK DEPLOYED NEURAL NETWORK MODELS

(71) Applicant: QUALCOMM INCORPORATED, San Diego, CA (US)

(72) Inventors: Srinivas Yerramalli, San Diego, CA (US); Taesang Yoo, San Diego, CA (US); Rajat Prakash, San Diego, CA (US); Mohammed Ali Mohammed Hirzallah, San Diego, CA (US); Roohollah Amiri, San Diego, CA (US); Marwen Zorgui, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 73 days.

(21) Appl. No.: 18/546,927

(22) PCT Filed: Apr. 13, 2022

(86) PCT No.: PCT/US2022/024655
§ 371 (c)(1),
(2) Date: Aug. 17, 2023

(87) PCT Pub. No.: WO2022/225768
PCT Pub. Date: Oct. 27, 2022

(65) Prior Publication Data

US 2024/0147264 A1 May 2, 2024

(30) Foreign Application Priority Data

Apr. 22, 2021 (IN) ............................ 202121018558

(51) Int. Cl.

| | |
|---|---|
| ***H04W 24/02*** | (2009.01) |
| ***H04W 8/22*** | (2009.01) |
| ***H04W 76/20*** | (2018.01) |

(52) U.S. Cl.
CPC ............ *H04W 24/02* (2013.01); *H04W 8/22* (2013.01); *H04W 76/20* (2018.02)

(58) Field of Classification Search
CPC ........... H04W 52/367; H04W 72/1215; H04W 72/569; H04W 72/56; H04W 88/06;
(Continued)

(56) References Cited

U.S. PATENT DOCUMENTS 11,228,379 B1 * 1/2022 O'Shea ................ G06N 3/0464
11,250,319 B1 * 2/2022 Huang .................. G06N 3/047
(Continued)

FOREIGN PATENT DOCUMENTS

JP 2022515929 A 2/2022
TW I700649 B 8/2020
(Continued)

OTHER PUBLICATIONS

International Search Report and Written Opinion—PCT/US2022/024655—ISA/EPO—Jul. 28, 2022.
(Continued)

*Primary Examiner* — Nathan S Taylor
(74) *Attorney, Agent, or Firm* — Holland & Hart LLP/QUALCOMM Incorporated

(57) ABSTRACT

Methods, systems, and devices for wireless communications are described. In some examples, a device (e.g., a user equipment (UE)) may obtain a configuration message indicating one or more neural network models from abase station. The UE may then obtain an indication of a sequence of operations for a signal processing procedure for a neural network model of the one or more neural network models.
(Continued)

In some examples, the signal processing procedure includes an input pre-processing procedure or an output pre-processing procedure. Upon obtaining a signal from a base station, the UE may perform the signal processing procedure on the received signal for the neural network model according to the sequence of operations.

42 Claims, 19 Drawing Sheets

(58) Field of Classification Search
CPC ..... H04W 92/10; H04W 92/18; H04W 52/36; H04W 72/12; H04W 72/566; H04W 52/14; H04W 52/34; H04W 36/0011; H04W 76/20; H04W 24/02; H04W 24/04; H04W 28/26; H04W 64/006; H04W 84/18; H04W 36/00; H04W 8/20; H04W 24/10; H04W 8/22; H04W 72/231; H04W 88/02; H04L 5/00; H04L 41/16; G06N 3/045; G06N 3/098; G06N 20/00; G06N 3/04; G06N 3/08
See application file for complete search history.

(56) References Cited

U.S. PATENT DOCUMENTS 11,922,284 B1 * 3/2024 Pirozzi ..................... G06N 5/04
2019/0180189 A1 6/2019 Biesemann et al.
2019/0187251 A1 6/2019 Ghosh
2019/0288895 A1 * 9/2019 Chen ................... H04W 72/542
2020/0143246 A1 5/2020 Li et al.
2020/0272795 A1 * 8/2020 Kenney ................... G06J 1/005
2020/0327185 A1 * 10/2020 Xu ........................... G06N 3/04
2020/0327371 A1 * 10/2020 Sharma ..................... G06N 5/04
2020/0413316 A1 * 12/2020 Isaksson ............. H04W 36/362
2021/0019555 A1 * 1/2021 Kalchbrenner ........ G06N 3/044
2021/0042115 A1 * 2/2021 Stephens ............. G06F 9/30105
2021/0049451 A1 2/2021 Wang et al.
2021/0383258 A1 * 12/2021 O'Riordan ............... G06N 3/08
2021/0390372 A1 * 12/2021 Byrne ....................... G06N 3/08
2021/0400383 A1 * 12/2021 Kinoshita ................ H04R 3/04
2022/0101150 A1 * 3/2022 Stroh ................... G06N 3/0442
2022/0113915 A1 * 4/2022 Ki ......................... G06F 3/0664
2022/0214322 A1 * 7/2022 Song ...................... G06F 18/217
2022/0269784 A1 * 8/2022 Oetken ................. G06F 21/562
2022/0374993 A1 * 11/2022 Kim ....................... G06Q 40/08
2025/0094854 A1 * 3/2025 Kou ......................... G06N 3/09

FOREIGN PATENT DOCUMENTS

WO WO-2019178493 9/2019
WO 2021029889 A1 2/2021
WO 2022208673 A1 10/2022

OTHER PUBLICATIONS

Taiwan Search Report—TW111114377—TIPO—Nov. 25, 2025.
Qualcomm Incorporated: "Other Aspects on AI/ML for CSI Feedback Enhancement", 3GPP TSG RAN WG1 #109-e, R1-2205025, No. tsgr1_109-e, e-Meeting, May 9, 2022-May 20, 2022, Apr. 29, 2022, pp. 1-6.

* cited by examiner

TECHNIQUES FOR INDICATING SIGNAL PROCESSING PROCEDURES FOR NETWORK DEPLOYED NEURAL NETWORK MODELS

CROSS REFERENCE

The present Application is a 371 national stage filing of International PCT Application No. PCT/US2022/024655 by YERRAMALLI et al. entitled "TECHNIQUES FOR INDICATING SIGNAL PROCESSING PROCEDURES FOR NETWORK DEPLOYED NEURAL NETWORK MODELS," filed Apr. 13, 2022; and claims priority to International Patent Application No. 202121018558 by YERRAMALLI et al. entitled "TECHNIQUES FOR INDICATING SIGNAL PROCESSING PROCEDURES FOR NETWORK DEPLOYED NEURAL NETWORK MODELS," filed Apr. 22, 2021, each of which is assigned to the assignee hereof, and each of which is expressly incorporated by reference in its entirety herein.

INTRODUCTION

The following relates to wireless communications and more specifically to methods and systems for indicating information related to signal processing procedures for neural network models.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communication at a device in a wireless network is described. The method may include obtaining a configuration message for the device, where the configuration message indicates one or more neural network models for the device, and obtaining an indication of a sequence of operations for a signal processing procedure for at least one neural network model of the one or more neural network models, where the signal processing procedure includes one of an input pre-processing procedure associated with the at least one neural network model or an output pre-processing procedure associated with the at least one neural network model. The method may further include performing the signal processing procedure for the at least one neural network model using a signal obtained at the device according to the sequence of operations.

An apparatus for wireless communication at a device in a wireless network is described. The apparatus may include a processor and memory coupled with the processor. The processor may be configured to obtain a configuration message for the device, where the configuration message indicates one or more neural network models for the device, and obtain an indication of a sequence of operations for a signal processing procedure for at least one neural network model of the one or more neural network models, where the signal processing procedure includes one of an input pre-processing procedure associated with the at least one neural network model or an output pre-processing procedure associated with the at least one neural network model. The processor may be further configured to perform the signal processing procedure for the at least one neural network model using a signal obtained at the device according to the sequence of operations.

Another apparatus for wireless communication at a device in a wireless network is described. The apparatus may include means for obtaining a configuration message for the device, where the configuration message indicates one or more neural network models for the device, and means for obtaining an indication of a sequence of operations for a signal processing procedure for at least one neural network model of the one or more neural network models, where the signal processing procedure includes one of an input pre-processing procedure associated with the at least one neural network model or an output pre-processing procedure associated with the at least one neural network model. The apparatus may further include means for performing the signal processing procedure for the at least one neural network model using a signal obtained at the device according to the sequence of operations.

A non-transitory computer-readable medium storing code for wireless communication at a device in a wireless network is described. The code may include instructions executable by a processor to obtain a configuration message for the device, where the configuration message indicates one or more neural network models for the device, and obtain an indication of a sequence of operations for a signal processing procedure for at least one neural network model of the one or more neural network models, where the signal processing procedure includes one of an input pre-processing procedure associated with the at least one neural network model or an output pre-processing procedure associated with the at least one neural network model. The code may further include instructions executable by the processor to perform the signal processing procedure for the at least one neural network model using a signal obtained at the device according to the sequence of operations.

Some examples of the method, apparatuses, and non-transitory computer-readable medium described herein may further include operations, features, means, or instructions for obtaining signaling that configures the device with a set of operations including one or more operations of the sequence of operations for the at least one neural network model.

In some examples of the method, apparatuses, and non-transitory computer-readable medium described herein, obtaining the indication of the sequence of operations may include operations, features, means, or instructions for obtaining the indication of the sequence of operations for the signal processing procedure in the configuration message, where the configuration message includes a set of operations including all operations of the sequence of operations for the at least one neural network model.

In some examples of the method, apparatuses, and non-transitory computer-readable medium described herein, obtaining the indication of the sequence of operations may include operations, features, means, or instructions for obtaining a second configuration message for the device, where the second configuration message indicates the at least one neural network model, the indication of the sequence of operations, and a set of operations including all operations of the sequence of operations for the at least one neural network model.

In some examples of the method, apparatuses, and non-transitory computer-readable medium described herein, obtaining the indication of the sequence of operations may include operations, features, means, or instructions for obtaining a set of input parameters, a set of output parameters, or both for one or more operations of the sequence of operations for the at least one neural network model.

Some examples of the method, apparatuses, and non-transitory computer-readable medium described herein may further include operations, features, means, or instructions for obtaining an indication of a mapping between the one or more neural network models and a set of operating conditions, where the signal processing procedure for the at least one neural network model may be performed using the signal obtained at the device according to the sequence of operations may be based on the mapping between the one or more neural network models and the set of operating conditions.

In some examples of the method, apparatuses, and non-transitory computer-readable medium described herein, the set of operating conditions includes a signal-to-noise ratio (SNR) range, a bandwidth range, a signal scaling range, a channel delay profile, a signal peak range, or any combination thereof, associated with the signal obtained at the device.

Some examples of the method, apparatuses, and non-transitory computer-readable medium described herein may further include operations, features, means, or instructions for outputting a message that indicates a capability of the device to support one or more operations for one or more signal processing procedures, where the indication of the sequence of operations for the signal processing procedure for the at least one neural network model may be obtained based on the capability of the device.

In some examples of the method, apparatuses, and non-transitory computer-readable medium described herein, the sequence of operations includes one or more operations supported by the device.

In some examples of the method, apparatuses, and non-transitory computer-readable medium described herein, the message that indicates the capability of the device to support the one or more operations for the one or more signal processing procedures includes an indication of a threshold input dimension for each of the one or more operations for the one or more signal processing procedures or a threshold run time for each of the one or more operations for the one or more signal processing procedures.

In some examples of the method, apparatuses, and non-transitory computer-readable medium described herein, obtaining the indication of the sequence of operations may include operations, features, means, or instructions for obtaining radio resource control (RRC) signaling or a medium access control (MAC) control element (MAC-CE) that includes the indication of the sequence of operations.

Some examples of the method, apparatuses, and non-transitory computer-readable medium described herein may further include operations, features, means, or instructions for obtaining an indication of one or more data formats associated with one or more operations of the sequence of operations, where the one or more data formats include an extensible markup language (XML) data format, a JavaScript Object Notation (JSON) data format, or any combination thereof.

In some examples of the method, apparatuses, and non-transitory computer-readable medium described herein, the device includes a UE, a base station, a network entity, a relay device, a sidelink device, or an integrated access and backhaul (IAB) node.

A method for wireless communication at a network entity is described. The method may include outputting a configuration message to a device, where the configuration message indicates one or more neural network models for the device, and outputting an indication of a sequence of operations for a signal processing procedure for at least one neural network model of the one or more neural network models, where the signal processing procedure includes one of an input pre-processing procedure associated with the at least one neural network model or an output pre-processing procedure associated with the at least one neural network model. The method may further include outputting a signal to the device based on the indication of the sequence of operations for the signal processing procedure for the at least one neural network model.

An apparatus for wireless communication at a network entity is described. The apparatus may include a processor and memory coupled with the processor. The processor may be configured to output a configuration message to a device, where the configuration message indicates one or more neural network models for the device, and output an indication of a sequence of operations for a signal processing procedure for at least one neural network model of the one or more neural network models, where the signal processing procedure includes one of an input pre-processing procedure associated with the at least one neural network model or an output pre-processing procedure associated with the at least one neural network model. The processor may be further configured to output a signal to the device based on the indication of the sequence of operations for the signal processing procedure for the at least one neural network model.

Another apparatus for wireless communication at a network entity is described. The apparatus may include means for outputting a configuration message to a device, where the configuration message indicates one or more neural network models for the device, and means for outputting an indication of a sequence of operations for a signal processing procedure for at least one neural network model of the one or more neural network models, where the signal processing procedure includes one of an input pre-processing procedure associated with the at least one neural network model or an output pre-processing procedure associated with the at least one neural network model. The apparatus may further include means for outputting a signal to the device based on the indication of the sequence of operations for the signal processing procedure for the at least one neural network model.

A non-transitory computer-readable medium storing code for wireless communication at a network entity is described. The code may include instructions executable by a processor to output a configuration message to a device, where the configuration message indicates one or more neural network models for the device, and output an indication of a sequence of operations for a signal processing procedure for at least one neural network model of the one or more neural network models, where the signal processing procedure includes one of an input pre-processing procedure associated with the at least one neural network model or an output pre-processing procedure associated with the at least one neural network model. The code may further include instructions executable by the processor to output a signal to the device based on the indication of the sequence of operations for the signal processing procedure for the at least one neural network model.

Some examples of the method, apparatuses, and non-transitory computer-readable medium described herein may further include operations, features, means, or instructions for outputting signaling that configures the device with a set of operations including one or more operations of the sequence of operations for the at least one neural network model.

Some examples of the method, apparatuses, and non-transitory computer-readable medium described herein may further include operations, features, means, or instructions for obtain a second sequence of operations for a second signaling procedure performed at the network entity.

In some examples of the method, apparatuses, and non-transitory computer-readable medium described herein, outputting the indication of the sequence of operations may include operations, features, means, or instructions for outputting the indication of the sequence of operations for the signal processing procedure in the configuration message, where the configuration message includes a set of operations including all operations of the sequence of operations for the at least one neural network model.

In some examples of the method, apparatuses, and non-transitory computer-readable medium described herein, outputting the indication of the sequence of operations may include operations, features, means, or instructions for outputting a second configuration message to the device, where the second configuration message indicates the at least one neural network model, the indication of the sequence of operations, and a set of operations including all operations of the sequence of operations for the at least one neural network model.

In some examples of the method, apparatuses, and non-transitory computer-readable medium described herein, outputting the indication of the sequence of operations may include operations, features, means, or instructions for outputting a set of input parameters, a set of output parameters, or both for one or more operations of the sequence of operations for the at least one neural network model.

Some examples of the method, apparatuses, and non-transitory computer-readable medium described herein may further include operations, features, means, or instructions for outputting an indication of a mapping between the one or more neural network models and a set of operating conditions.

In some examples of the method, apparatuses, and non-transitory computer-readable medium described herein, the set of operating conditions includes an SNR range, a bandwidth range, a signal scaling range, a channel delay profile, a signal peak range, or any combination thereof, associated with the signal transmitted to the device.

Some examples of the method, apparatuses, and non-transitory computer-readable medium described herein may further include operations, features, means, or instructions for obtaining a message that indicates a capability of the device to support one or more operations for one or more signal processing procedures, where obtaining the indication of the sequence of operations for the signal processing procedure for the at least one neural network model may be based on the capability of the device.

In some examples of the method, apparatuses, and non-transitory computer-readable medium described herein, the sequence of operations includes one or more operations supported by the device.

In some examples of the method, apparatuses, and non-transitory computer-readable medium described herein, the message that indicates the capability of the device to support the one or more operations for the one or more signal processing procedures includes an indication of a threshold input dimension for each of the one or more operations for the one or more signal processing procedures or a threshold run time for each of the one or more operations for the one or more signal processing procedures.

In some examples of the method, apparatuses, and non-transitory computer-readable medium described herein, outputting the indication of the sequence of operations may include operations, features, means, or instructions for outputting RRC signaling or a MAC-CE that includes the indication of the sequence of operations.

Some examples of the method, apparatuses, and non-transitory computer-readable medium described herein may further include operations, features, means, or instructions for outputting an indication of one or more data formats associated with one or more operations of the sequence of operations, where the one or more data formats include an XML data format, a JSON data format, or any combination thereof.

In some examples of the method, apparatuses, and non-transitory computer-readable medium described herein, the device includes a UE, a base station, a network entity, a relay device, a sidelink device, or an IAB node.

A method for wireless communication at a device in a wireless network is described. The method may include receiving a configuration message for the device, the configuration message indicating one or more neural network models for the device, receiving an indication of a sequence of operations for a signal processing procedure for at least one neural network model of the one or more neural network models, the signal processing procedure including one of an input pre-processing procedure associated with the at least one neural network model or an output preprocessing procedure associated with the at least one neural network model, and performing the signal processing procedure for the at least one neural network model using a signal received at the device according to the sequence of operations.

An apparatus for wireless communication at a device in a wireless network is described. The apparatus may include a processor, memory coupled with the processor, and instructions stored in the memory. The instructions may be executable by the processor to cause the apparatus to receive a configuration message for the device, the configuration message indicating one or more neural network models for the device, receive an indication of a sequence of operations for a signal processing procedure for at least one neural network model of the one or more neural network models, the signal processing procedure including one of an input pre-processing procedure associated with the at least one neural network model or an output preprocessing procedure associated with the at least one neural network model, and perform the signal processing procedure for the at least one neural network model using a signal received at the device according to the sequence of operations.

Another apparatus for wireless communication at a device in a wireless network is described. The apparatus may include means for receiving a configuration message for the device, the configuration message indicating one or more neural network models for the device, means for receiving an indication of a sequence of operations for a signal processing procedure for at least one neural network model of the one or more neural network models, the signal processing procedure including one of an input pre-processing procedure associated with the at least one neural network model or an output preprocessing procedure associated with the at least one neural network model, and means for performing the signal processing procedure for the at least one neural network model using a signal received at the device according to the sequence of operations.

A non-transitory computer-readable medium storing code for wireless communication at a device in a wireless network is described. The code may include instructions executable by a processor to receive a configuration message for the device, the configuration message indicating one or more neural network models for the device, receive an indication of a sequence of operations for a signal processing procedure for at least one neural network model of the one or more neural network models, the signal processing procedure including one of an input pre-processing procedure associated with the at least one neural network model or an output preprocessing procedure associated with the at least one neural network model, and perform the signal processing procedure for the at least one neural network model using a signal received at the device according to the sequence of operations.

Some examples of the method, apparatuses, and non-transitory computer-readable medium described herein may further include operations, features, means, or instructions for receiving signaling configuring the device with a set of operations including one or more operations of the sequence of operations for the at least one neural network model.

Some examples of the method, apparatuses, and non-transitory computer-readable medium described herein may further include operations, features, means, or instructions for receiving the indication of the sequence of operations for the signal processing procedure in the configuration message, where the configuration message includes a set of operations including all operations of the sequence of operations for the at least one neural network model.

Some examples of the method, apparatuses, and non-transitory computer-readable medium described herein may further include operations, features, means, or instructions for receiving a second configuration message for the device, the second configuration message indicating the at least one neural network model, the indication of the sequence of operations, and a set of operations including all operations of the sequence of operations for the at least one neural network model.

Some examples of the method, apparatuses, and non-transitory computer-readable medium described herein may further include operations, features, means, or instructions for receiving a set of input parameters, a set of output parameters, or both for one or more operations of the sequence of operations for the at least one neural network model.

Some examples of the method, apparatuses, and non-transitory computer-readable medium described herein may further include operations, features, means, or instructions for receiving an indication of a mapping between the one or more neural network models and a set of operating conditions, where performing the signal processing procedure for the at least one neural network model using the signal received at the device according to the sequence of operations may be based on the mapping between the one or more neural network models and the set of operating conditions.

In some examples of the method, apparatuses, and non-transitory computer-readable medium described herein, the set of operating conditions includes a SNR range, a bandwidth range, a signal scaling range, a channel delay profile, a signal peak range, or any combination thereof, associated with the signal received at the device.

Some examples of the method, apparatuses, and non-transitory computer-readable medium described herein may further include operations, features, means, or instructions for transmitting a message indicating a capability of the device to support one or more operations for one or more signal processing procedures, where receiving the indication of the sequence of operations for the signal processing procedure for the at least one neural network model may be based on the capability of the device.

In some examples of the method, apparatuses, and non-transitory computer-readable medium described herein, the sequence of operations includes one or more operations supported by the device.

In some examples of the method, apparatuses, and non-transitory computer-readable medium described herein, the message indicating the capability of the device to support the one or more operations for one or more signal processing procedures includes an indication of a threshold input dimension for each of the one or more operations for the one or more signal processing procedures or a threshold run time for each of the one or more operations for the one or more signal processing procedures.

Some examples of the method, apparatuses, and non-transitory computer-readable medium described herein may further include operations, features, means, or instructions for receiving RRC signaling or a MAC-CE that includes the indication of the sequence of operations.

Some examples of the method, apparatuses, and non-transitory computer-readable medium described herein may further include operations, features, means, or instructions for receiving an indication of one or more data formats associated with one or more operations of the sequence of operations, the one or more data formats including an XML data format, a JSON data format, or any combination thereof.

In some examples of the method, apparatuses, and non-transitory computer-readable medium described herein, the device includes a UE, a base station, a network entity, a relay device, a sidelink device, or an IAB node.

A method for wireless communication at a base station is described. The method may include transmitting a configuration message to a device, the configuration message indicating one or more neural network models for the device, transmitting an indication of a sequence of operations for a signal processing procedure for at least one neural network model of the one or more neural network models, the signal processing procedure including one of an input pre-processing procedure associated with the at least one neural network model or an output preprocessing procedure associated with the at least one neural network model, and transmitting a signal to the device based on transmitting the indication of the sequence of operations for the signal processing procedure for the at least one neural network model.

An apparatus for wireless communication at a base station is described. The apparatus may include a processor, memory coupled with the processor, and instructions stored in the memory. The instructions may be executable by the processor to cause the apparatus to transmit a configuration message to a device, the configuration message indicating one or more neural network models for the device, transmit an indication of a sequence of operations for a signal processing procedure for at least one neural network model of the one or more neural network models, the signal processing procedure including one of an input pre-processing procedure associated with the at least one neural network model or an output preprocessing procedure associated with the at least one neural network model, and transmit a signal to the device based on transmitting the indication of the sequence of operations for the signal processing procedure for the at least one neural network model.

Another apparatus for wireless communication at a base station is described. The apparatus may include means for transmitting a configuration message to a device, the configuration message indicating one or more neural network models for the device, means for transmitting an indication of a sequence of operations for a signal processing procedure for at least one neural network model of the one or more neural network models, the signal processing procedure including one of an input pre-processing procedure associated with the at least one neural network model or an output preprocessing procedure associated with the at least one neural network model, and means for transmitting a signal to the device based on transmitting the indication of the sequence of operations for the signal processing procedure for the at least one neural network model.

A non-transitory computer-readable medium storing code for wireless communication at a base station is described. The code may include instructions executable by a processor to transmit a configuration message to a device, the configuration message indicating one or more neural network models for the device, transmit an indication of a sequence of operations for a signal processing procedure for at least one neural network model of the one or more neural network models, the signal processing procedure including one of an input pre-processing procedure associated with the at least one neural network model or an output preprocessing procedure associated with the at least one neural network model, and transmit a signal to the device based on transmitting the indication of the sequence of operations for the signal processing procedure for the at least one neural network model.

Some examples of the method, apparatuses, and non-transitory computer-readable medium described herein may further include operations, features, means, or instructions for transmitting signaling configuring the device with a set of operations including one or more operations of the sequence of operations for the at least one neural network model.

Some examples of the method, apparatuses, and non-transitory computer-readable medium described herein may further include operations, features, means, or instructions for receiving a second sequence of operations for a second signaling procedure performed at the base station.

Some examples of the method, apparatuses, and non-transitory computer-readable medium described herein may further include operations, features, means, or instructions for transmitting the indication of the sequence of operations for the signal processing procedure in the configuration message, where the configuration message includes a set of operations including all operations of the sequence of operations for the at least one neural network model.

Some examples of the method, apparatuses, and non-transitory computer-readable medium described herein may further include operations, features, means, or instructions for transmitting a second configuration message to the device, the second configuration message indicating the at least one neural network model, the indication of the sequence of operations, and a set of operations including all operations of the sequence of operations for the at least one neural network model.

Some examples of the method, apparatuses, and non-transitory computer-readable medium described herein may further include operations, features, means, or instructions for transmitting a set of input parameters, a set of output parameters, or both for one or more operations of the sequence of operations for the at least one neural network model.

Some examples of the method, apparatuses, and non-transitory computer-readable medium described herein may further include operations, features, means, or instructions for transmitting an indication of a mapping between the one or more neural network models and a set of operating conditions.

In some examples of the method, apparatuses, and non-transitory computer-readable medium described herein, the set of operating conditions includes an SNR range, a bandwidth range, a signal scaling range, a channel delay profile, a signal peak range, or any combination thereof, associated with the signal transmitted to the device.

Some examples of the method, apparatuses, and non-transitory computer-readable medium described herein may further include operations, features, means, or instructions for receiving a message indicating a capability of the device to support one or more operations for one or more signal processing procedures, where receiving the indication of the sequence of operations for the signal processing procedure for the at least one neural network model may be based on the capability of the device.

In some examples of the method, apparatuses, and non-transitory computer-readable medium described herein, the sequence of operations includes one or more operations supported by the device.

In some examples of the method, apparatuses, and non-transitory computer-readable medium described herein, the message indicating the capability of the device to support the one or more operations for the one or more signal processing procedures includes an indication of a threshold input dimension for each of the one or more operations for one or more signal processing procedures or a threshold run time for each of the one or more operations for the one or more signal processing procedures.

Some examples of the method, apparatuses, and non-transitory computer-readable medium described herein may further include operations, features, means, or instructions for transmitting RRC signaling or a MAC-CE that includes the indication of the sequence of operations.

Some examples of the method, apparatuses, and non-transitory computer-readable medium described herein may further include operations, features, means, or instructions for transmitting an indication of one or more data formats associated with one or more operations of the sequence of operations, the one or more data formats including an XML data format, a JSON data format, or any combination thereof.

In some examples of the method, apparatuses, and non-transitory computer-readable medium described herein, the device includes a UE, a base station, a network entity, a relay device, a sidelink device, or an IAB node.

DETAILED DESCRIPTION

Figure 1:
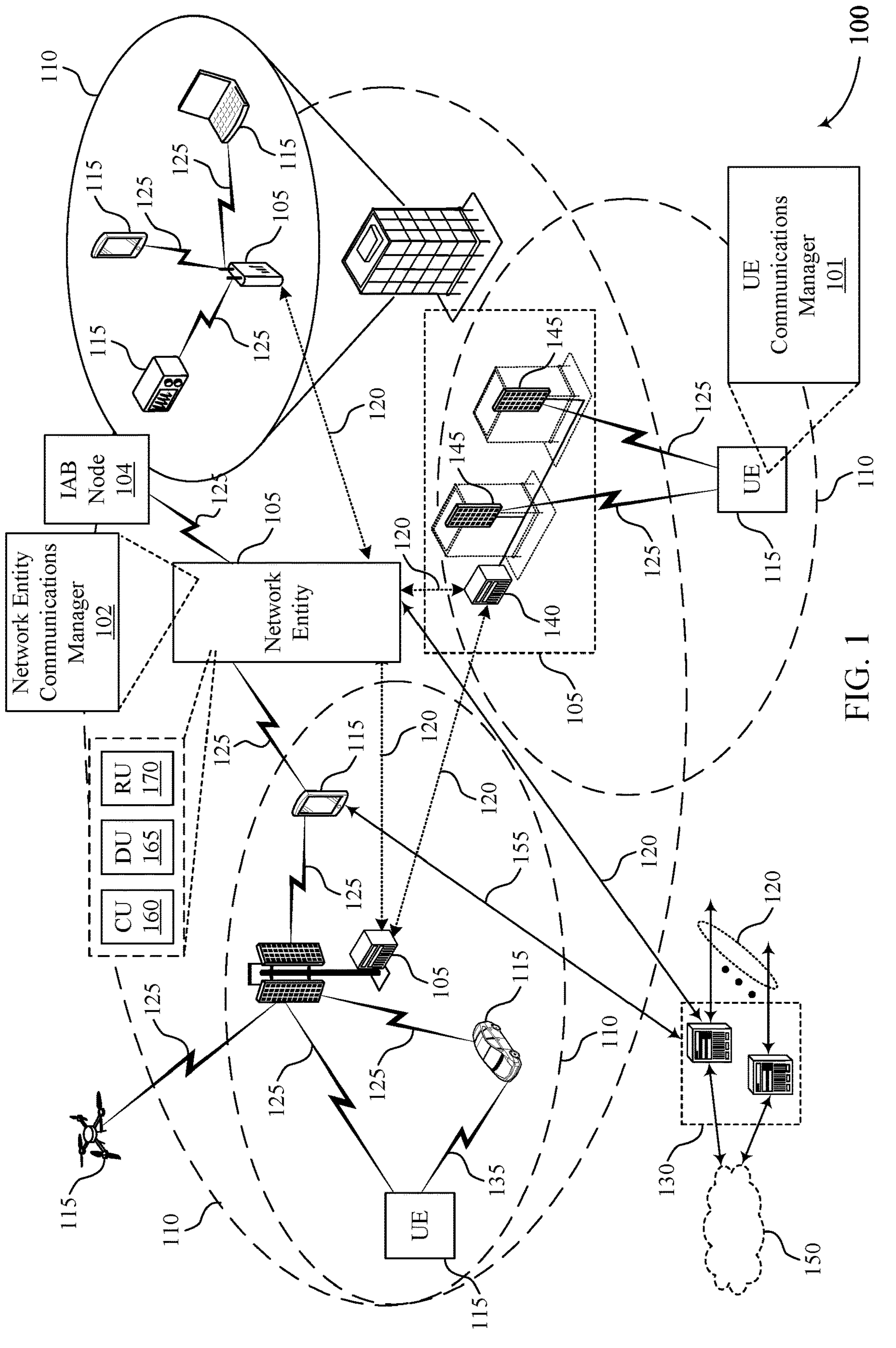
FIGS. 1 and 2 illustrate examples of a wireless communications system that supports techniques for indicating signal processing procedures for network deployed neural network models in accordance with one or more aspects of the present disclosure.

Some wireless communications systems may support machine learning or neural network models (also referred to as machine learning models), which may be used to optimize wireless communication processes such as decoding, encoding, analog-to-digital conversions, generating information to report to higher layers or for transmission in response to a received signal, etc. To utilize a neural network model, a device (e.g., a UE) may perform pre-processing on a received signal prior to input into the neural network model, which may convert a received signal into a format that is compatible with the neural network model (e.g., a format which is capable of being received and processed by the neural network model). As it is used herein, the term "pre-processing" may be used to refer to any operations, procedures, algorithms, or mathematical computations which may be performed to convert a signal into a format which is capable of being received and processed by a neural network model.

Similarly, the device may perform post-processing on an output of the neural network model, which may convert the output into a format that is compatible with reporting the output to the network or higher layers of the device (e.g., format of the output that is capable of being received and/or processed by the network or higher layers). The output of the neural network model may include a modified version of the signal that was input into the neural network model, a determination or calculation performed by the neural network model based on the input, and the like. However, methods of providing wireless devices (e.g., UEs) with information and instructions for performing signal processing (e.g., pre-processing and post-processing) for neural network models implemented within a wireless communications system have not yet been considered. That is, some wireless communications systems have not defined or contemplated signaling and configurations which may be used to provide UEs and other wireless devices with information (e.g., operations, instructions) that enable the respective UEs and wireless devices to perform neural network models within the respective wireless communications system.

As described herein, the device may receive (e.g., obtain) signaling indicating signal processing (e.g., pre-processing or post-processing) operations and an order to perform the operations for a the respective pre-processing, post-processing, and neural network model. Neural network models may include the same signal processing operations (e.g., elementary functions or non-trainable layers), such as signal scaling operations, circular shift operations, inverse fast-Fourier transform (IFFT) operation, etc. Although the signal processing operations may be common across neural network models, the sequence in which the operations are executed and the input and output parameters for the operations may be different for each neural network model. Accordingly, aspects of the present disclosure are directed to signaling and techniques which enable wireless devices (e.g., UEs) to be configured with pre-processing and post-processing operations associated with signal processing and neural network models. In this regard, aspects of the present disclosure may enable UEs to implement operations associated with signal processing and neural network models in a correct order (e.g., proper temporal order of operations), thereby enabling wireless devices to more efficiently and effectively perform signal processing operations associated with neural network models.

For the purposes of the present disclosure, the term "signal processing procedure," "signal processing operation," and like terms, may be used to refer to any procedure or operation for processing a physical layer signal covering time, frequency, spatial, and/or code domain(s), observed at one or more time instances. As such, the terms "signal processing procedure" and "signal processing operation" may be used for processing various types of signals, including radio frequency signals, audio/video (A/V) signals, time series data, images, and the like.

In one example, the network (e.g., entity of a wireless communications system, such as a network entity or base station) may configure the device with a set of signal processing operations (e.g., which may be defined in the standards) and indicate a signal sequence of operations (e.g., an order to execute the set of operations) for each neural network model as well as input and output parameters for the operations (e.g., via RRC signaling or a MAC-CE). The sequence of operations may indicate a sequence of operation subsets included in a set of operations (e.g., set of operations includes a first subset of operations, then a second subset of operations, etc.), and/or a sequence of operations within a given subset of operations (e.g., subset of operations includes a first operation then a second operation). Upon obtaining or receiving a signal (e.g., from a network entity), the device may perform the signal processing according to the sequence of the operations. In another example, the network (e.g., network entity) may signal the signal processing operations for a neural network model, a sequence of operations, and input and output parameters together with the neural network model as part of a complete package to the device.

In some examples, the device may also obtain or receive signaling indicating relationships between neural network models and operating ranges (e.g., SNR ranges or bandwidth ranges) which the device may utilize to dynamically select a neural network model to apply to a received signal. Moreover, the device may output or transmit signaling indicating its capability to perform signal processing operations to the network and the network may use this capability signaling to determine which neural network models to provide the device. Using the methods described herein, the device may obtain (e.g., receive) information related to signal processing and perform signaling processing according to the information for neural network models deployed by wireless devices (e.g., UEs) within a wireless communications system. As such, techniques described herein may enable UEs and other wireless devices to more efficiently and effectively perform signal processing operations that facilitate neural network models, which may enable more complex and reliable processing within the wireless communications system.

Aspects of the disclosure are initially described in the context of wireless communications systems. Additional aspects of the disclosure are described in the context of a flowchart, a machine learning process, and a process flow. Aspects of the disclosure are further illustrated by and described with reference to apparatus diagrams, system diagrams, and flowcharts that relate to techniques for indicating signal processing procedures for network deployed neural network models.

FIG. 1 illustrates an example of a wireless communications system 100 that supports techniques for indicating signal processing procedures for network deployed neural network models in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The network entities 105 may be dispersed throughout a geographic area to form the wireless communications system 100 and may be devices in different forms or having different capabilities. The network entities 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the network entities 105, or network equipment (e.g., core network nodes, relay devices, IAB nodes, or other network equipment), as shown in FIG. 1.

The network entities 105 may communicate with the core network 130, or with one another, or both. For example, the network entities 105 may interface with the core network 130 through one or more backhaul links 120 (e.g., via an S1, N2, N3, or other interface). The network entities 105 may communicate with one another over the backhaul links 120 (e.g., via an X2, Xn, or other interface) either directly (e.g., directly between network entities 105), or indirectly (e.g., via core network 130), or both. In some examples, the backhaul links 120 may be or include one or more wireless links.

One or more of the network entities 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

As described herein, a node, which may be referred to as a node, a network node, a network entity, or a wireless node, may be a base station (e.g., any base station described herein), a UE (e.g., any UE described herein), a network controller, an apparatus, a device, a computing system, one or more components, and/or another suitable processing entity configured to perform any of the techniques described herein. For example, a network node may be a UE. As another example, a network node may be a base station. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to obtain or receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE being configured to receive information from a base station also discloses that a first network node being configured to receive information from a second network node, the first network node may refer to a first UE, a first base station, a first apparatus, a first device, a first computing system, a first one or more components, a first processing entity, or the like configured to receive the information; and the second network node may refer to a second UE, a base station, a second apparatus, a second device, a second computing system, a first one or more components, a first processing entity, or the like.

As described herein, communication of information (e.g., any information, signal, or the like) may be described in various aspects using different terminology. Disclosure of one communication term includes disclosure of other communication terms. For example, a first network node may be described as being configured to output or transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1. In some examples, a UE 115 may communicate with the core network 130 through communication link 155.

The UEs 115 and the network entities 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

Signal waveforms transmitted over a carrier may be made up of multiple sub carriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different network entities 105. The wireless communications system 100 may include, for example, a heterogeneous network in which different types of the network entities 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). In some examples, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, or FR5, or may be within the EHF band The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

Techniques described herein, in addition to or as an alternative to be carried out between UEs 115 and network entities 105, may be implemented via additional or alternative wireless devices, including IAB nodes 104, distributed units (DUs) 165, centralized units (CUs) 160, radio units (RUs) 170, and the like. For example, in some implementations, aspects described herein may be implemented in the context of a disaggregated radio access network (RAN) architecture (e.g., open RAN architecture). In a disaggregated architecture, the RAN may be split into three areas of functionality corresponding to the CU 160, the DU 165, and the RU 170. The split of functionality between the CU 160, DU 165, and RU 175 is flexible and as such gives rise to numerous permutations of different functionalities depending upon which functions (e.g., MAC functions, baseband functions, radio frequency functions, and any combinations thereof) are performed at the CU 160, DU 165, and RU 175. For example, a functional split of the protocol stack may be employed between a DU 165 and an RU 170 such that the DU 165 may support one or more layers of the protocol stack and the RU 170 may support one or more different layers of the protocol stack.

Some wireless communications systems (e.g., wireless communications system 100), infrastructure and spectral resources for NR access may additionally support wireless backhaul link capabilities in supplement to wireline backhaul connections, providing an IAB network architecture. One or more network entities 105 may include CUs 160, DUs 165, and RUs 170 and may be referred to as donor network entities 105 or IAB donors. One or more DUs 165 (e.g., and/or RUs 170) associated with a donor base station 105 may be partially controlled by CUs 160 associated with the donor base station 105. The one or more donor network entities 105 (e.g., IAB donors) may be in communication with one or more additional network entities 105 (e.g., IAB nodes 104) via supported access and backhaul links. IAB nodes 104 may support mobile terminal (MT) functionality controlled and/or scheduled by DUs 165 of a coupled IAB donor. In addition, the IAB nodes 104 may include DUs 165 that support communication links with additional entities (e.g., IAB nodes 104, UEs 115, etc.) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In some examples, the wireless communications system 100 may include a core network 130 (e.g., a next generation core network (NGC)), one or more IAB donors, IAB nodes 104, and UEs 115, where IAB nodes 104 may be partially controlled by each other and/or the IAB donor. The IAB donor and IAB nodes 104 may be examples of aspects of network entities 105. IAB donor and one or more IAB nodes 104 may be configured as (e.g., or in communication according to) some relay chain.

For instance, an access network (AN) or RAN may refer to communications between access nodes (e.g., IAB donor), IAB nodes 104, and one or more UEs 115. The IAB donor may facilitate connection between the core network 130 and the AN (e.g., via a wireline or wireless connection to the core network 130). That is, an IAB donor may refer to a RAN node with a wireline or wireless connection to core network 130. The IAB donor may include a CU 160 and at least one DU 165 (e.g., and RU 170), where the CU 160 may communicate with the core network 130 over an NG interface (e.g., some backhaul link). The CU 160 may host layer 3 (L3) (e.g., RRC, service data adaption protocol (SDAP), PDCP, etc.) functionality and signaling. The at least one DU 165 and/or RU 170 may host lower layer, such as layer 1 (L1) and layer 2 (L2) (e.g., RLC, MAC, physical (PHY), etc.) functionality and signaling, and may each be at least partially controlled by the CU 160. The DU 165 may support one or multiple different cells. IAB donor and IAB nodes 104 may communicate over an F1 interface according to some protocol that defines signaling messages (e.g., F1 AP protocol). Additionally, CU 160 may communicate with the core network over an NG interface (which may be an example of a portion of backhaul link), and may communicate with other CUs 160 (e.g., a CU 160 associated with an alternative IAB donor) over an Xn-C interface (which may be an example of a portion of a backhaul link).

IAB nodes 104 may refer to a RAN node that provides IAB functionality (e.g., access for UEs 115, wireless self-backhauling capabilities, etc.). IAB nodes 104 may include a DU 165 and an MT. A DU 165 may act as a distributed scheduling node towards child nodes associated with the IAB node 104, and the MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, an IAB node 104 may also be referred to as a parent node or a child node to other IAB nodes 104, depending on the relay chain or configuration of the AN. Therefore, the MT entity of IAB nodes 104 (e.g., MTs) may provide a Uu interface for a child node to receive signaling from a parent IAB node 104, and the DU interface (e.g., DUs 165) may provide a Uu interface for a parent node to signal to a child IAB node 104 or UE 115.

For example, IAB node 104 may be referred to a parent node associated with IAB node, and a child node associated with IAB donor. The IAB donor may include a CU 160 with a wireline (e.g., optical fiber) or wireless connection to the core network and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture (e.g., one or more IAB nodes 104 or components of IAB nodes 104) may be configured to support techniques for large round trip times in random access channel procedures as described herein. For example, some operations described as being performed by a UE 115 or a base station 105 may additionally or alternatively be performed by components of the disaggregated RAN architecture (e.g., IAB nodes, DUs, CUs, etc.).

In some examples, the wireless communications system 100 may support neural network modeling and a communications manager 101 may be included in a device to support signal processing when implementing a neural network model. In some aspects, the base station 105 may include a communications manager 101-*a* and the UE 115 may include a communications manager 101-*b*. The communications manager 101-*a* may transmit one or more neural network models, an indication of a sequence of operations, and a signal to the UE 115. The sequence of operations may inform the UE 115 of an order to execute operations for signaling processing for each neural network model. In response, the communications manager 101-*b* may select a neural network model based on the received signal and perform signaling processing according to the sequence of operations for the selected model. In some examples, the communications manager 101-*b* may transmit, prior to transmitting the sequence of operations, signaling configuring the UE 115 with a set of operations, where the sequence of operation includes one or more of the set of operations. In another example, the communications manager 101-*b* may transmit the set of operations, the sequence of operations, and the one or more neural network models together as one package. In either case, the UE 115 may obtain information related to signal processing for one or more neural network models.

Figure 2:
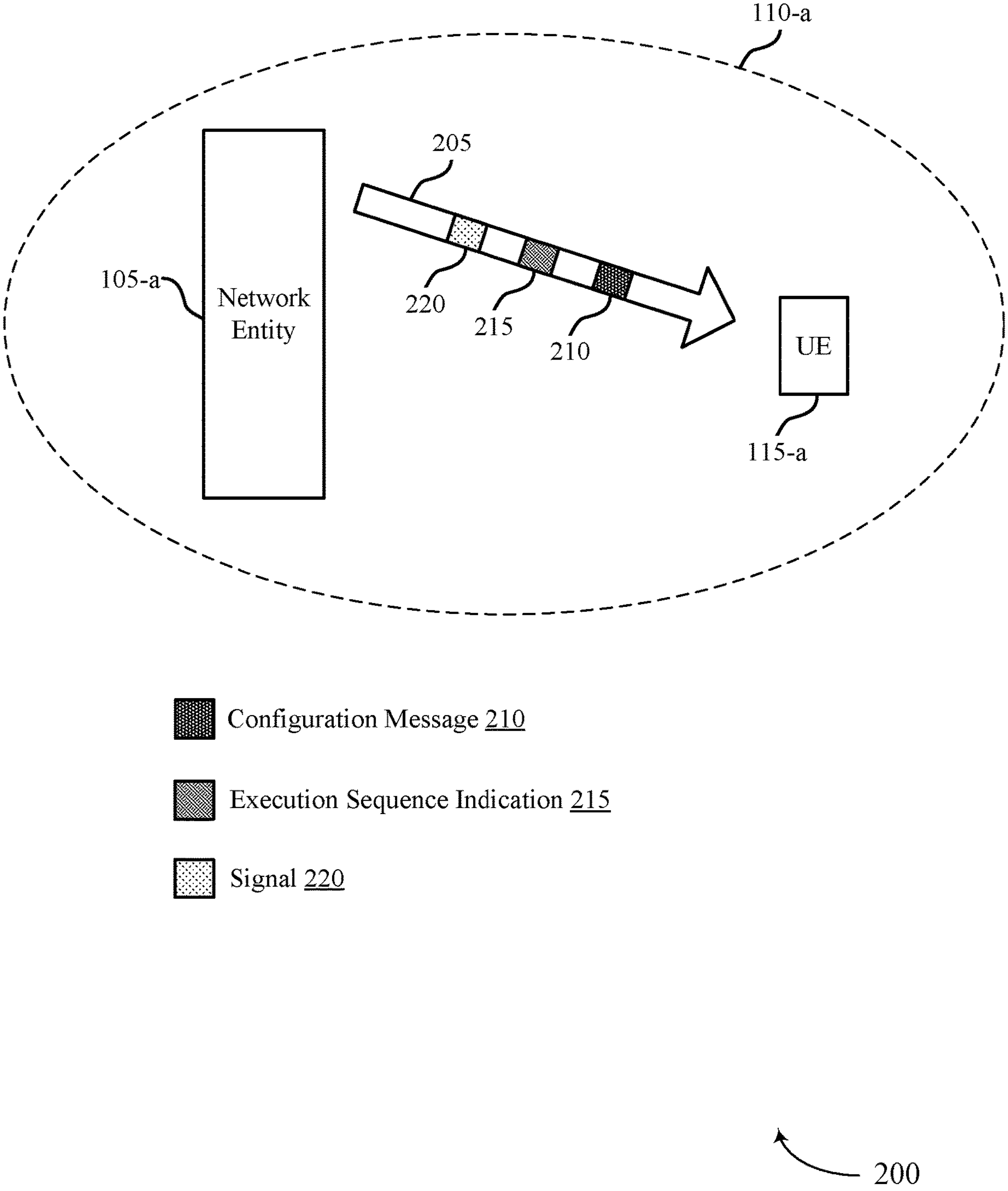

FIG. 2 illustrates an example of a wireless communications system 200 that supports techniques for indicating signal processing procedures for network deployed neural network models in accordance with one or more aspects of the present disclosure. In some examples, the wireless communications system 200 may implement, or be implemented by, aspects of the wireless communications system 100. For example, the wireless communications system 200 may include a base station 105-*a* and a UE 115-*a* which may be examples of a base station 105 and a UE 115 as described with reference to FIG. 1. In some examples, the base station 105-*a* and the UE 115-*a* may be located in coverage area 110-*a* and may communicate via downlink communication link 205.

In some examples, the wireless communications system 200 may support machine learning or neural network models. Neural network models may be examples of programs that are trained to recognize patterns and a wireless communications system may utilize neural network models to optimize wireless communication processes. For example, a wireless communications system may utilize a neural network model to detect delays related to line-of-sight (LOS) signals, among other examples.

In some cases, the network, such as a base station 105-*a*, may configure a wireless device, such as a UE 115-*a*, with neural network models such that the wireless device may implement the neural network models. For example, the base station 105-*a* may use a format (e.g., open neural network exchange (ONNX) format) to encode and output (e.g., provide, transmit) one or more neural network models to the UE 115-*a* via downlink communication link 205. The UE 115-*a* may interpret the one or more neural network models using a decoder and implement the one or more neural network models. In some examples, the network may determine which neural network models to provide to the wireless device based on the current operating scenario (e.g., a number of antennas, operating SNRs, operating bandwidth parts, modulation, or radio frequency models). Each of the neural network models provided to the wireless device may be valid under some operating range. For example, each of the neural network models may be valid under a given SNR range, a given bandwidth range, a given channel power delay profile, a given signal scaling range, a given signal peak range, etc. The wireless device may determine characteristics of an obtained (e.g., received) signal (e.g., signal SNR or signal bandwidth) and implement a neural network model whose operating range includes the characteristics of the obtained signal.

In order to implement a neural network model or report output of a neural network model, a wireless device may perform signal processing. Signal processing may include one of at least pre-processing or post-processing. A wireless device (e.g., a UE 115-*a*) may perform pre-processing to convert a received signal into a format that is compatible for input to the neural network model. Similarly, a wireless device (e.g., a UE 115-*a*) may perform post-processing to convert the output of the neural network model into a format which may be mapped compatible for reporting, where the reports may be sent to higher layers at the wireless device (internal layers or external layers) or transmitted as signals to other devices (e.g., base station 105-*a*).

Using other techniques, a wireless device (e.g., a UE 115-*a*) may be pre-configured with information on how to perform signal processing for all neural network models designed by the network, which may include hundreds or thousands of neural network models designed for the different operating scenarios. However, the network may provide the wireless device with a relatively small subset of these neural network models and as such, preconfiguring the wireless device with information on how to perform signaling processing for all neural network models may not be feasible or efficient. In addition, neural network architectures may continue to evolve, which may be more suitable for different processing operations.

As described herein, a wireless device may obtain or receive signaling indicating information for performing signal processing (e.g., pre-processing or post-processing) for network deployed neural network models. In some examples, operations (e.g., elementary functions or non-trainable layers) for signal processing may be common across different neural network models, but the sequence in which to execute the operations and the input and output parameters may differ. In one example, the UE 115-*a* or the base station 105-*a* may be pre-configured with a set of operations, where each operation of the set may include a number of inputs and outputs (options for inputs and outputs).

Some examples of the operations that the UE 115-*a* may be configured with are a channel feedback report (CFR) operation, zero-padding operation, IFFT operation (e.g., operation to convert a signal from the frequency domain to the time domain), signal scaling operation (e.g., operation to scale a magnitude or amplitude of a signal), peak search operation (e.g., operation to identify a peak or maximum magnitude/amplitude of a signal), circular shift operation (e.g., bitwise rotation, or operation to shift bits of a signal), truncation operation, concatenate operation, complex-to-real operation, any linear algebra operation (e.g., singular value decomposition (SVD), QR decomposition, Cholesky decomposition, determinant, rank, condition number, or eigen values), or any matrix and vector equation. In some examples, the matrix and vector operations may be obtained through mathematical or scientific computing libraries such as NumPy, SciPy, LinAlg, etc. That is, the UE 115-*a* may utilize any vector, matrix, or tensor operations or any linear algebra methods as part of the signal processing (e.g., pre-processing or post-processing).

While communicating with the base station 105-*a*, the UE 115-*a* may obtain or receive one or more neural network models from the network. For example, the UE 115-*a* may receive a configuration message 210 indicating a first neural network model from the base station 105-*a*. Upon receiving the one or more neural network models, the UE 115-*a* may receive an execution sequence indication 215. The execution sequence indication 215 may indicate a sequence of operations or an order to execute at least a subset of the set of operations for the one or more signal processing procedures for each neural network model provided to the UE 115-*a*. For example, the execution sequence indication 215 for a LOS delay detection neural network model may indicate to execute operations for signal processing in the following order: a channel feedback report operation, a zero-padding operation, an IFFT operation, a signal scaling operation, a peak search operation, a circular shift operation, a truncation operation, a concatenate operation, and a complex-to-real operation. In addition, the execution sequence indication 215 may include an indication of input parameters and output parameters for each step (e.g., for each operation in the sequence) for each neural network model. For example, the execution sequence indication 215 may indicate to input a left peak shift and output a peak index for the circular shift operation for the LOS delay detection neural network model. In some examples, the execution sequence indication 215 may be included in RRC signaling or a MAC-CE. In some examples, signaling formats such as XML and JSON may be used to signal the execution sequence indication 215 or may indicate the format support for pre-processing, post-processing, or for the machine learning model. Example code for an execution sequence indication for a LOS delay detection neural network model is shown below in Table 1.

TABLE 1

```
LOS-Delay-PosNN-Model-PreProc::=            SEQUENCE {
   ParamConfig::=                           SEQUENCE {
      PerResourceSet                           CHOICE{Independent,
Combined}
      PerResource                              CHOICE{Independent,
Combined}
      PerRxAntennaInput                        CHOICE{Independent,
Combined, Best-N}
       Best-N                                  CHOICE{1,2,.,NumRxAnt]
    }
    ExecuteSequence:: {
      RemoveZeroFromCFRComb
          ZeroPad                            SEQUENCE(2 of
INTEGER(1,NumTones))
      IFFT                                 SEQUENCE{
        { Input-Oversampling                 INTEGER{1,2,4,8}
         Output-Scaling                    CHOICE(1,N,1/N, 1/sqrt(N))
         Output-DC-Centering                 CHOICE{True, False}
         }
      Scaling                                SEQUENCE{
         Input-ScalingType                     CHOICE{PeakScaling,
L1NormScaling, L2Norm Scaling}
      FindPeak                               SEQUENCE{
         Output-PeakIndex                      INTEGER(1 to LenInput)
      }
      CircShift                              SEQUENCE{
         Input-LeftPeakShift                   Output-PeakIndex
      }
      Truncate                               SEQEUNCE(
         Input-LeftTruncate                    INTEGER(1 to LenInput)
         Input-RightTruncate                   INTEGER(1 to LenInput)
      }
      ComplexToReal                          SEQUENCE{
         Input-ExpandDim
      INTEGER(2,DimInput+1)
         Input-AddMagVector                    CHOICE(True, False)
         Input-AddPhaseVector                  CHOICE(True, False)
      }
      MultiResourceConcatenate               SEQUENCE{
         Input-ConcatenateDim                  INTEGER(1 to
DimInput)
         Input-PRSResourceConcatenate          CHOICE(True, False)
         Input-PRSResourceSetConcatenate       CHOICE(True, False)
         Input-RXAntennaConcatenate            CHOICE(True, False)
      }
      CheckDim                               SEQUENCE{
         dim1                                  INTEGER(1 to 65536)
         dim2                                  INTEGER(1 to 65536)
    }
    NNModel                                  ModelName
    ShiftAndScaleNNOutput                    SEQUENCE{
         Input-shift                           MULT(−1, Output-
PeakIndex)
         Input-scale                           MULT(INTEGER, Input-
shift)
     }
    QUANTIZE                                 SEQUENCE{
         Input-QuantizeType                    CHOICE{Uniform, Non-
Uniform}
```

TABLE 1-continued

```
        Input-Stepsize                                  INTEGER(1 to
MaxStepSize)
        Output-Value                                    INTEGER(1 to 65536)
    }
  }
}
```

The wireless device may perform signal processing on a received signal based on the execution sequence indication 215. For example, the UE 115-*a* may obtain a signal 220 from the base station 105-*a* and determine characteristics of the signal 220 (e.g., signal SNR or signal bandwidth). The UE 115-*a* may select a neural network model (e.g., the first neural network model) based on the determined signal characteristics and perform pre-processing on the obtained signal 220 according to the sequence of operations indicated in the execution sequence indication 215 for the selected neural network model. Once the signal 220 undergoes pre-processing, the UE 115-*a* may implement the selected neural network model. After implementing the neural network model, the UE 115-*a* may, in some examples, perform post-processing on the received signal 220 according to the sequence of operations indicated in the execution sequence indication 215 for the selected neural network model and report the output of the neural network model to higher layers or in a transmission to the base station 105-*a*.

Alternatively, the network may augment a neural network model with information for performing signal processing for the neural network model. In such examples, the configuration message 210 may include a neural network model and a signal processing function for the neural network model (e.g., a set of operations, a sequence to execute the set of operations, and input and output parameters for each operation). The base station 105-*a* may utilize a format (e.g., ONNX format) to encode and output (e.g., provide, transmit) the neural network model and the signal processing function and the UE 115-*a* may obtain (e.g., receive) and decode the neural network model and the signaling processing function according to the format. In such cases, the UE 115-*a* may not be preconfigured with the set of operations for signal processing and receive the execution sequence indication 215, but instead, the UE 115-*a* may receive the configuration message 210 for the some neural network model and perform signal processing for the neural network model based on the configuration message 210. In some examples, the UE 115-*a* may receive multiple configuration messages 210 in order to gain information on signal processing for multiple neural network models.

In some examples, the base station 105-*a* may receive signaling indicating information related to signal processing for neural network models. For example, the base station 105-*a* may receive an execution sequence indication from machine learning blocks (e.g., real time and non-real time radio access network (RAN) intelligent controller) for one or more neural network models. The execution sequence indication may indicate an order to execute a set of operations preconfigured at the base station 105-*a* for signal processing for the one or more neural network models. When the base station 105-*a* receives a signal, the base station 105-*a* may perform signal processing on the signal based on the execution sequence indication.

In another example, the UE 115-*a* may obtain or receive multiple neural network models, where each neural network model may be valid under different operating ranges. In such examples, the set of operations pre-configured at the UE 115-*a* may include one or more operations to determine one or more characteristics of a received signal. For example, the UE 115-*a* may be preconfigured with an operation to compute SNR. The execution sequence indication 215 may indicate to execute the one or operations to determine one or more characteristics of a received signal as part of signal processing and select a neural network model based on the output of the one or more operations. For example, the execution sequence indication 215 may specify to select a first neural network model if the SNR of the signal 220 is below a threshold and to select a second neural network model if the SNR is above a threshold. The one or more operations may be an example of a table or function which takes some input (e.g., SNR of the signal 220) and produces a model identifier (ID) as the output.

In some examples, the UE 115-*a* may indicate its capability to support the set of operations preconfigured at the UE 115-*a*. For example, the UE 115-*a* may output or transmit a signal to the base station 105-*a* indicating that it supports basic math, but does not support complex operations (e.g., singular value decomposition (SVD) or QR decomposition). In another example, the UE 115-*a* may indicate a threshold input dimension for one or more operations of the set of operations preconfigured at the UE 115-*a*. For example, the UE 115-*a* may output or transmit a signal to the base station 105-*a* indicating that it does support 4×4 SVD, but does not support 8×8 SVD or 16×8 SVD. Moreover, the UE 115-*a* may indicate a threshold run time for one or more operations of the set of operations preconfigured at the UE 115-*a*. If the UE 115-*a* indicates that it is unable to support one or more operations of the set of operations, the base station 105-*a* may output or transmit additional network models to the UE 115-*a*.

Figure 3:
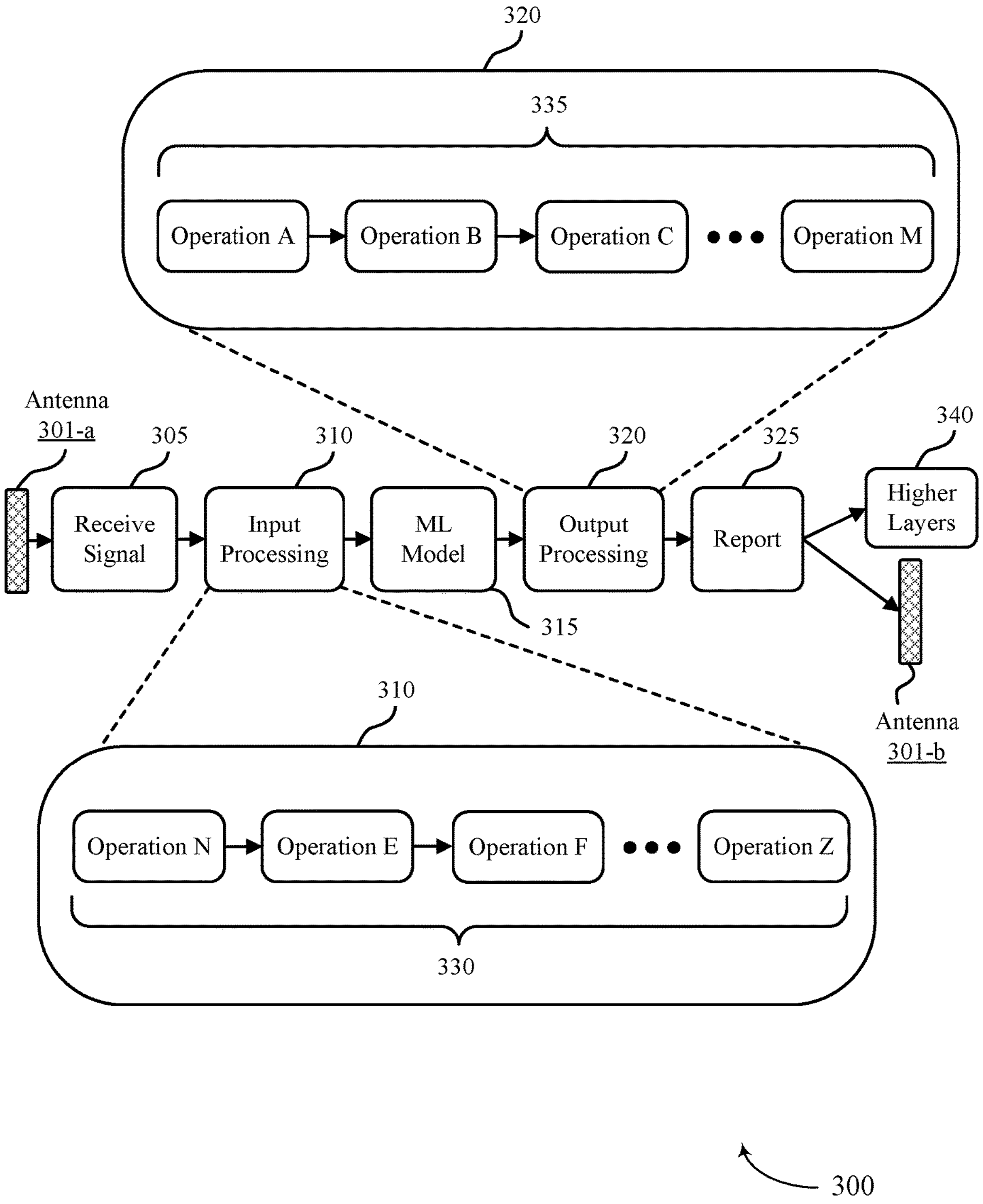
FIG. 3 illustrates an example of a flowchart that supports techniques for indicating signal processing procedures for network deployed neural network models in accordance with one or more aspects of the present disclosure.

FIG. 3 illustrates an example of a flow chart 300 that supports techniques for indicating signal processing procedures for network deployed neural network models in accordance with one or more aspects of the present disclosure. In some examples, the flow chart 300 may implement aspects of the wireless communications system 100 and the wireless communications system 200. For example, the flow chart 300 may be implemented by a UE 115 or a base station 105 as described with reference to FIGS. 1 and 2.

In some examples, a wireless device may be preconfigured with a set of operations and obtain/receive signaling indicating a sequence of operations for input processing (e.g., sequence of operations 330) or a sequence of operations for output processing (e.g., sequence of operations 335) for each neural network model provided to the wireless device. Additionally, the signaling may indicate input parameters and output parameters for each operation of the sequence of operations.

In some examples, the wireless device may obtain or receive a signal (e.g., from a base station) at 305 via one or more antennas 301-*a*. In some examples, the wireless device may determine characteristics of the signal and select a neural network model based on characteristics of the signal. For example, the wireless device may determine that the signal is associated with an SNR above a threshold and select a first neural network. Alternatively, the wireless device may determine that the signal is associated with an SNR below a threshold and select a second neural network. Once the wireless device identifies which neural network model to implement, the wireless device may perform input processing on the received signal at 310. In some examples, the wireless device may perform input processing according to the sequence of operations 330. In one example, the wireless device may implement a neural network model for LOS delay detection. In such case, the sequence of operations 330 may be as follows: a CFR operation, a zero-padding operation, an IFFT operation, a signal scaling operation, a peak search operation, a circular shift operation, a truncation operation, a concatenate operation, a complex-to-real operation and each operation may have specified output and input parameters. Input processing may convert the received signal into a format that is compatible with the selected neural network model and as such, the wireless device may implement the selected neural network model at 315.

At 320, the wireless device may perform output processing. In some examples, the wireless device may perform output processing according to the sequence of operations 335. In one example, the wireless device may implement the neural network model for LOS delay detection. In such example, the sequence of operations 335 may indicate to shift and scale the output by the results of the circular shift operation performed at 310. In some examples, the sequence of operations 335 and the sequence of operations 330 may include different operations or one or more of the same operations. After performing output processing, the wireless device may map the output of the neural network model to one or more reports at 325 and the wireless device may send the report to higher layers 340 or output/transmit the report to the network or a base station via one or more antennas 301-*b*.

Figure 4:
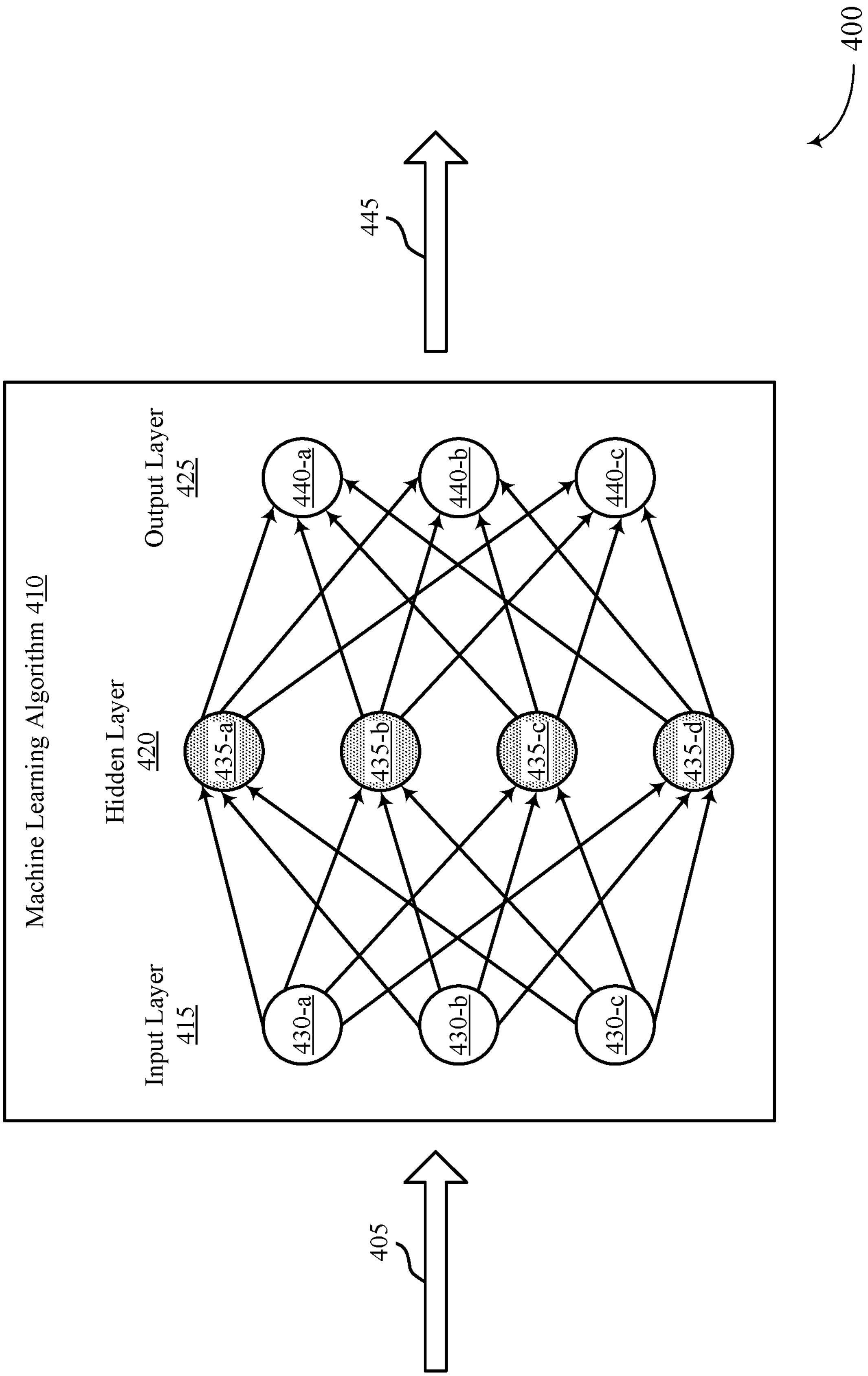
FIG. 4 illustrates an example of a machine learning process that support techniques for indicating signal processing procedures for network deployed neural network models in accordance with one or more aspects of the present disclosure.

FIG. 4 illustrates an example of a machine learning process 400 that supports techniques for indicating signal processing procedures for network deployed neural network models in accordance with one or more aspects of the present disclosure. The machine learning process 400 may be implemented at a wireless device, such as a UE 115 as described with reference to FIGS. 1-3. The machine learning process 400 may include a machine learning algorithm 410. In some examples, the wireless device may receive a neural network model from a base station 105 and implement one or more machine learning algorithms 410 as part of the neural network model to optimize communication processes.

As illustrated, the machine learning algorithm 410 may be an example of a neural net, such as a feed forward (FF) or deep feed forward (DFF) neural network, a recurrent neural network (RNN), a long/short term memory (LSTM) neural network, or any other type of neural network. However, any other machine learning algorithms may be supported by the UE 115. For example, the machine learning algorithm 410 may implement a nearest neighbor algorithm, a linear regression algorithm, a Naïve Bayes algorithm, a random forest algorithm, or any other machine learning algorithm. Furthermore, the machine learning process 400 may involve supervised learning, unsupervised learning, semi-supervised learning, reinforcement learning, or any combination thereof. The machine learning may be performed prior to deployment of a UE 115, while the UE 115 is deployed, during low usage periods of the UE 115 while the UE 115 is deployed, or any combination thereof.

The machine learning algorithm 410 may include an input layer 415, one or more hidden layers 420, and an output layer 425. In a fully connected neural network with one hidden layer 420, each hidden layer node 435 may receive a value from each input layer node 430 as input, where each input is weighted. These neural network weights may be based on a cost function that is revised during training of the machine learning algorithm 410. Similarly, each output layer node 440 may receive a value from each hidden layer node 435 as input, where the inputs are weighted. If post-deployment training (e.g., online training) is supported at a UE 115, the UE 115 may allocate memory to store errors and/or gradients for reverse matrix multiplication. These errors and/or gradients may support updating the machine learning algorithm 410 based on output feedback. Training the machine learning algorithm 410 may support computation of the weights (e.g., connecting the input layer nodes 430 to the hidden layer nodes 435 and the hidden layer nodes 435 to the output layer nodes 440) to map an input pattern to a desired output outcome. This training may result in a UE-specific machine learning algorithm 410 based on the historic application data and data transfer for a specific UE 115.

The UE 115 may send input values 405 to the machine learning algorithm 410 for processing. In some examples, the UE 115 may perform pre-processing according to a sequence of operations received from the base station on the input values 405 such that the input values 405 may be in a format that is compatible with the machine learning algorithm 410. The input values 405 may be converted into a set of k input layer nodes 430 at the input layer 415. In some cases, different measurements may be input at different input layer nodes 430 of the input layer 415. Some input layer nodes 430 may be assigned default values (e.g., values of 0) if the number of input layer nodes 430 exceeds the number of inputs corresponding to the input values 405. As illustrated, the input layer 415 may include three input layer nodes 430-*a*, 430-*b*, and 430-*c*. However, it is to be understood that the input layer 415 may include any number of input layer nodes 430 (e.g., 20 input nodes).

The machine learning algorithm 410 may convert the input layer 415 to a hidden layer 420 based on a number of input-to-hidden weights between the k input layer nodes 430 and the n hidden layer nodes 435. The machine learning algorithm 410 may include any number of hidden layers 420 as intermediate steps between the input layer 415 and the output layer 425. Additionally, each hidden layer 420 may include any number of nodes. For example, as illustrated, the hidden layer 420 may include four hidden layer nodes 435-*a*, 435-*b*, 435-*c*, and 435-*d*. However, it is to be understood that the hidden layer 420 may include any number of hidden layer nodes 435 (e.g., 10 input nodes). In a fully connected neural network, each node in a layer may be based on each node in the previous layer. For example, the value of hidden layer node 435-*a* may be based on the values of input layer nodes 430-*a*, 430-*b*, and 430-*c* (e.g., with different weights applied to each node value).

The machine learning algorithm 410 may determine values for the output layer nodes 440 of the output layer 425 following one or more hidden layers 420. For example, the machine learning algorithm 410 may convert the hidden layer 420 to the output layer 425 based on a number of hidden-to-output weights between the n hidden layer nodes 435 and the m output layer nodes 440. In some cases, n=m. Each output layer node 440 may correspond to a different output value 445 of the machine learning algorithm 410. As illustrated, the machine learning algorithm 410 may include three output layer nodes 440-*a*, 440-*b*, and 440-*c*, supporting three different threshold values. However, it is to be understood that the output layer 425 may include any number of output layer nodes 440. In some examples, the UE 115 may perform post-processing according to a sequence of operations received from the base station on the output values 445 such that the input values 405 may be in a format that is compatible with reporting the output values 445 to higher layers or in a transmission to the base station 105.

Figure 5:
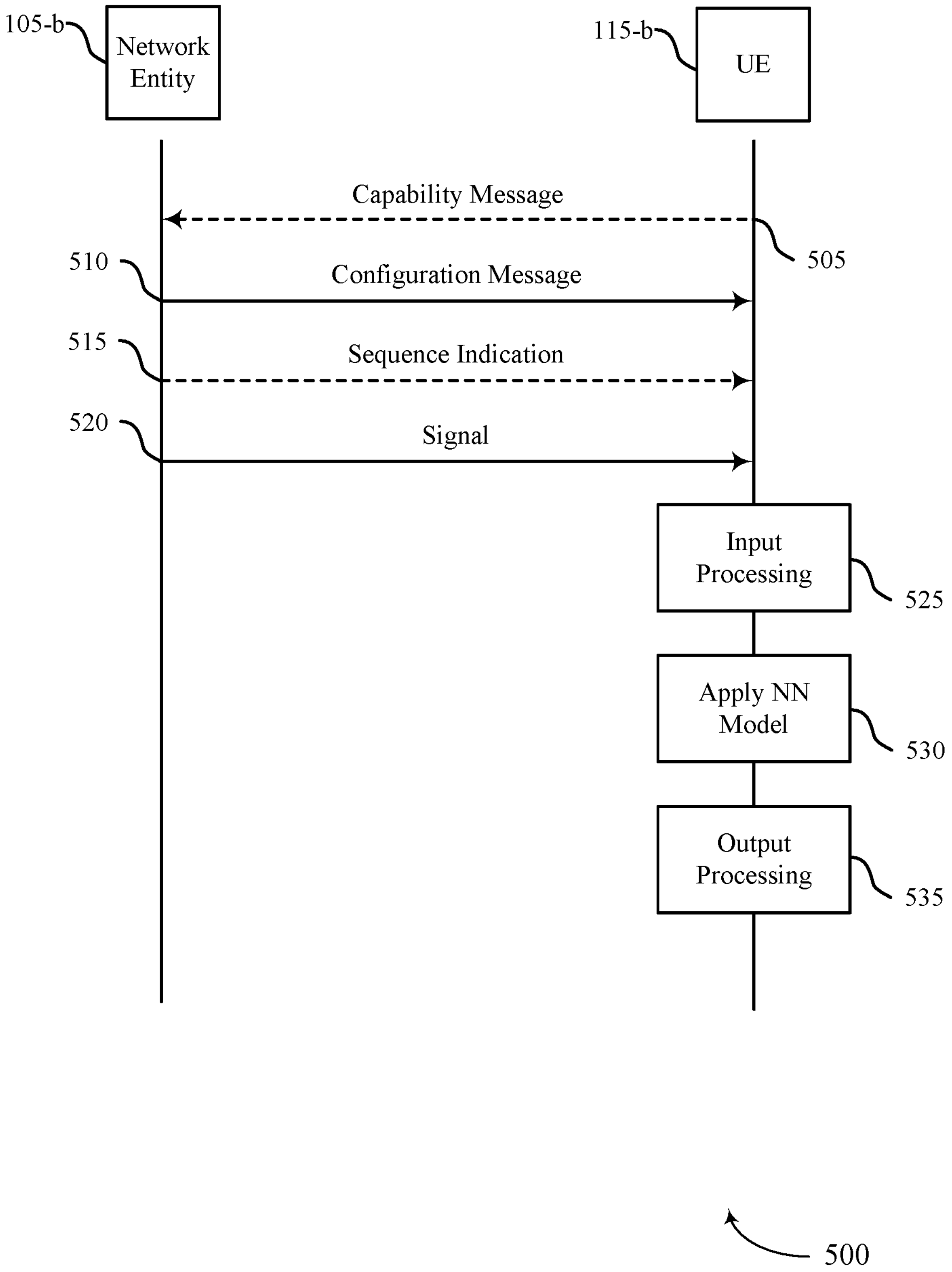
FIG. 5 illustrates an example of a process flow that supports techniques for indicating signal processing procedures for network deployed neural network models in accordance with one or more aspects of the present disclosure.

FIG. 5 illustrates an example of a process flow 500 that supports techniques for indicating signal processing procedures for network deployed neural network models in accordance with one or more aspects of the present disclosure. In some examples, the process flow 500 may implement or be implemented by aspects of a wireless communications system 100, a wireless communications system 200, and a flow chart 300. The process flow 500 may involve a UE 115-*b* receiving signaling indicating information related to signaling processing for one or more neural network models. Alternative examples of the following may be implemented, where some steps are performed in a different order than described or are not performed at all. In some cases, steps may include additional features not mentioned below, or further steps may be added.

At 505, the UE 115-*b* may potentially output or transmit a capability message to the base station 105-*b*. The capability message may indicate a capability of the UE 115-*b* to support one or more operations for signal processing. In some examples, the capability message may include an indication of a threshold input dimension for the one or more operations for signaling processing or a threshold run time for each of the one or more operations for signal processing.

At 510, the UE 115-*b* may obtain or receive a configuration message from the base station 105-*b*. The configuration message may include an indication of one or more neural network models. In some examples, the base station 105-*b* may determine the one or more neural network models to output/transmit to the UE 115-*b* based on current operating conditions (e.g., number of antennas, operating SNRs, operating bandwidth parts, modulation, or radio frequency models) or based on the capability message received at 505.

At 515, the UE 115-*b* may obtain or receive an indication of a sequence of operations from the base station 105-*b* for each of the one or more neural network models provided to the UE 115-*b* at 510. In one example, the UE 115-*b* may be configured with a set of operations (e.g., elementary functions or non-trainable layers) associated with signal processing and the sequence of operations may specify the order to execute at least a subset of the set operations for signal processing (pre-processing or post-processing). The sequence of operations may also include input and output parameters for each operation of the subset. In another example, the set of operations and the sequence of operations for a neural network of the one or more neural network models may be included in the configuration message received at 510. In such case, the UE 115-*b* may not receive an indication of the sequence of operations at 515.

At 520, the UE 115-*b* may obtain or receive a signal from the base station 105-*b*. In some examples, the UE 115-*b* may determine characteristics of the signal (e.g., SNR, bandwidth, or signal scale) and select a neural network model to implement based on the characteristics of the signal. In some cases, the UE 115-*b* may be preconfigured with a table or a function indicating a relationship between neural network models and operating ranges (e.g., SNR ranges, bandwidth ranges, or signal scale ranges) and the UE 115-*b* may select the neural network model based on the table or function as part of signal processing (e.g., pre-processing).

At 525, the UE 115-*b* may perform input processing on the signal received at 520. In some examples, the UE 115-*b* may perform input processing according to the sequence of operations indicated at 515 or the sequence of operations included in the configuration message received at 510.

At 530, the UE 115-*b* may apply a neural network model.

At 535, the UE 115-*b* may perform output processing on the neural network model output. In some examples, the UE 115-*b* may perform output processing according to the sequence of operations indicated at 515 or the sequence of operations included in the configuration message received at 510. Upon performing the output processing, the UE 115-*b* may map the output to one or more reports and potentially output or transmit the one or more reports to the base station 105-*b*.

Figure 6:
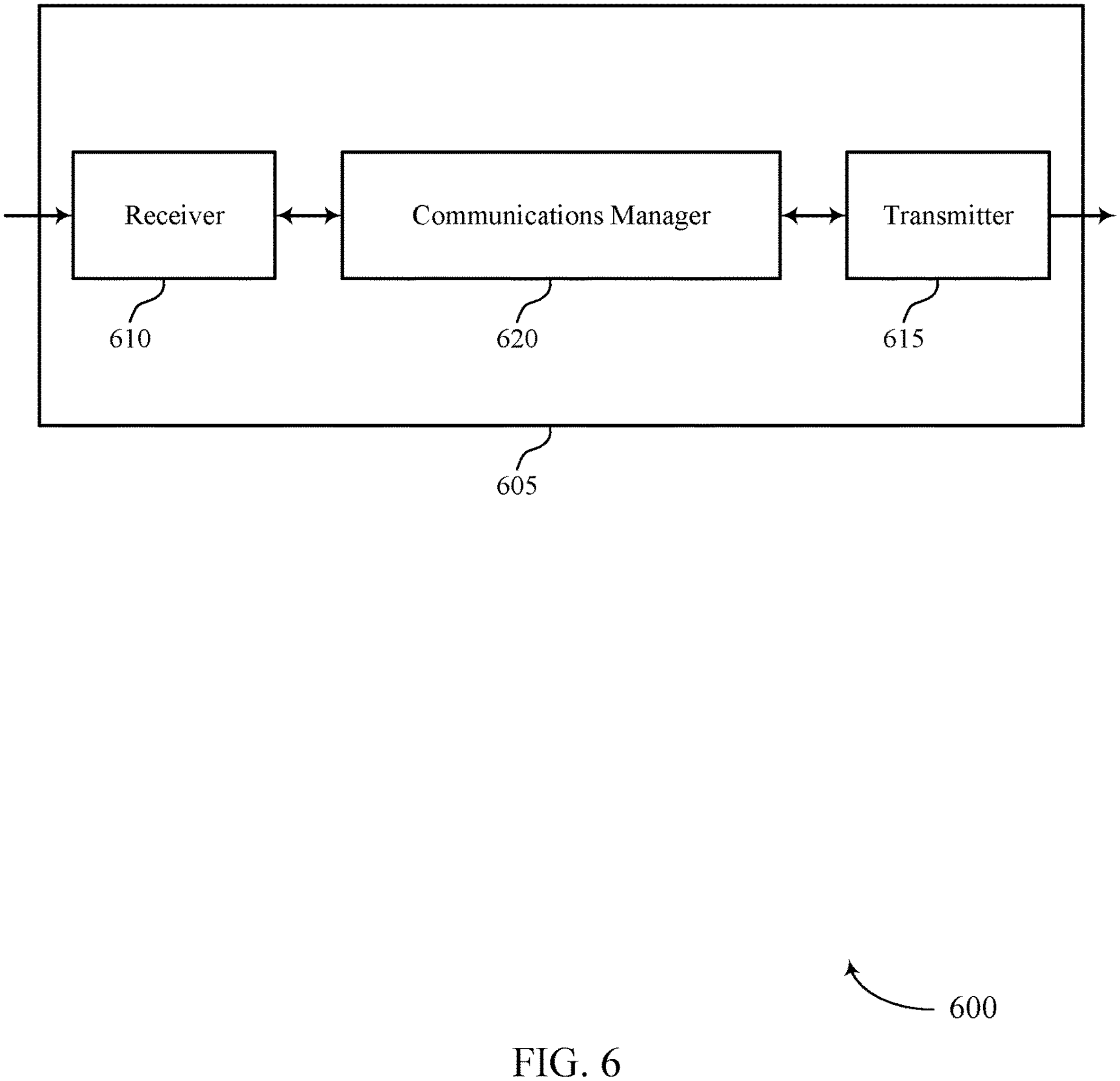
FIGS. 6 and 7 show block diagrams of devices that support techniques for indicating signal processing procedures for network deployed neural network models in accordance with one or more aspects of the present disclosure.

FIG. 6 shows a block diagram 600 of a device 605 that supports techniques for indicating signal processing procedures for network deployed neural network models in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for obtaining (e.g., receiving) information such as packets, user data, control information, or any combination thereof associated with various information channels (e.g., control channels, data channels, information channels related to techniques for indicating signal processing procedures for network deployed neural network models). Information may be passed on to other components of the device 605. The receiver 610 may utilize a single antenna or a set of multiple antennas.

The transmitter 615 may provide a means for outputting (e.g., providing, transmitting) signals generated by other components of the device 605. For example, the transmitter 615 may transmit information such as packets, user data, control information, or any combination thereof associated with various information channels (e.g., control channels, data channels, information channels related to techniques for indicating signal processing procedures for network deployed neural network models). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for indicating signal processing procedures for network deployed neural network models as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., obtaining/receiving, monitoring, outputting/transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a device in a wireless network in accordance with examples as disclosed herein. For example, the communications manager 620 may be configured as or otherwise support a means for receiving a configuration message for the device, the configuration message indicating one or more neural network models for the device. The communications manager 620 may be configured as or otherwise support a means for receiving an indication of a sequence of operations for a signal processing procedure for at least one neural network model of the one or more neural network models, the signal processing procedure including one of an input pre-processing procedure associated with the at least one neural network model or an output pre-processing procedure associated with the at least one neural network model. The communications manager 620 may be configured as or otherwise support a means for performing the signal processing procedure for the at least one neural network model using a signal received at the device according to the sequence of operations.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reduced processing and reduced power consumption. Receiving information related to signal processing may allow the device 605 to implement a neural network model. By implementing a neural network model, the device 605 may optimize communication processes which may in turn reduce power consumption at the device 605.

Figure 7:
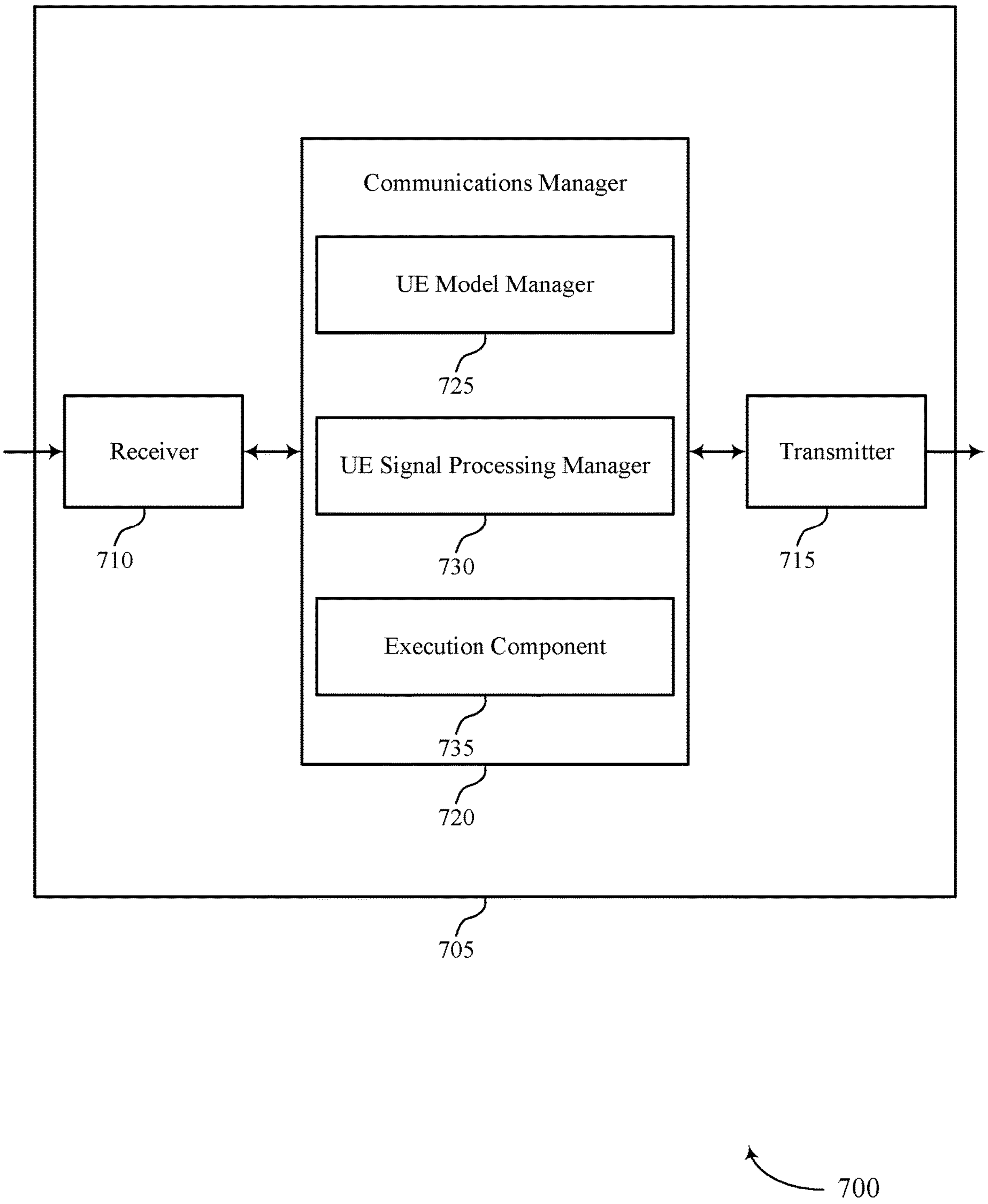

FIG. 7 shows a block diagram 700 of a device 705 that supports techniques for indicating signal processing procedures for network deployed neural network models in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for obtaining (e.g., receiving) information such as packets, user data, control information, or any combination thereof associated with various information channels (e.g., control channels, data channels, information channels related to techniques for indicating signal processing procedures for network deployed neural network models). Information may be passed on to other components of the device 705. The receiver 710 may utilize a single antenna or a set of multiple antennas.

The transmitter 715 may provide a means for outputting (e.g., transmitting) signals generated by other components of the device 705. For example, the transmitter 715 may transmit information such as packets, user data, control information, or any combination thereof associated with various information channels (e.g., control channels, data channels, information channels related to techniques for indicating signal processing procedures for network deployed neural network models). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for indicating signal processing procedures for network deployed neural network models as described herein. For example, the communications manager 720 may include a UE model manager 725, a UE signal processing manager 730, an execution component 735, or any combination thereof. The communications manager 720 may be an example of aspects of a communications manager 620 as described herein. In some examples, the communications manager 720, or various components thereof, may be configured to perform various operations (e.g., obtaining/receiving, monitoring, outputting/transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a device in a wireless network in accordance with examples as disclosed herein. The UE model manager 725 may be configured as or otherwise support a means for receiving a configuration message for the device, the configuration message indicating one or more neural network models for the device. The UE signal processing manager 730 may be configured as or otherwise support a means for receiving an indication of a sequence of operations for a signal processing procedure for at least one neural network model of the one or more neural network models, the signal processing procedure including one of an input pre-processing procedure associated with the at least one neural network model or an output pre-processing procedure associated with the at least one neural network model. The execution component 735 may be configured as or otherwise support a means for performing the signal processing procedure for the at least one neural network model using a signal received at the device according to the sequence of operations.

Figure 8:
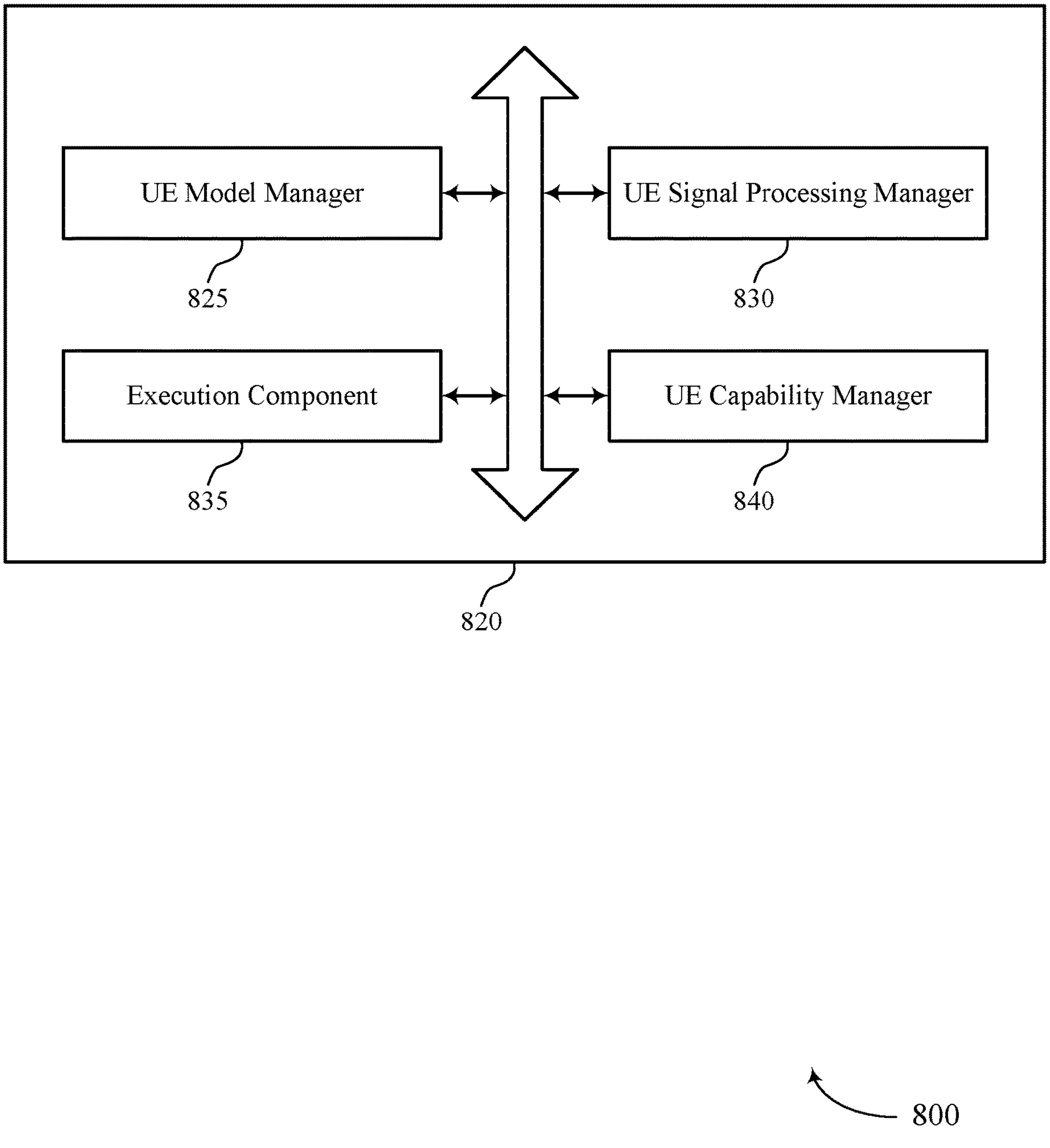
FIG. 8 shows a block diagram of a communications manager that supports techniques for indicating signal processing procedures for network deployed neural network models in accordance with one or more aspects of the present disclosure.

FIG. 8 shows a block diagram 800 of a communications manager 820 that supports techniques for indicating signal processing procedures for network deployed neural network models in accordance with one or more aspects of the present disclosure. The communications manager 820 may be an example of aspects of a communications manager 620, a communications manager 720, or both, as described herein. The communications manager 820, or various components thereof, may be an example of means for performing various aspects of techniques for indicating signal processing procedures for network deployed neural network models as described herein. For example, the communications manager 820 may include a UE model manager 825, a UE signal processing manager 830, an execution component 835, a UE capability manager 840, or any combination thereof. Each of these components may communicate, directly or indirectly, with one another (e.g., via one or more buses).

The communications manager 820 may support wireless communication at a device in a wireless network in accordance with examples as disclosed herein. The UE model manager 825 may be configured as or otherwise support a means for receiving a configuration message for the device, the configuration message indicating one or more neural network models for the device. The UE signal processing manager 830 may be configured as or otherwise support a means for receiving an indication of a sequence of operations for a signal processing procedure for at least one neural network model of the one or more neural network models, the signal processing procedure including one of an input pre-processing procedure associated with the at least one neural network model or an output pre-processing procedure associated with the at least one neural network model. The execution component 835 may be configured as or otherwise support a means for performing the signal processing procedure for the at least one neural network model using a signal received at the device according to the sequence of operations.

In some examples, the UE signal processing manager 830 may be configured as or otherwise support a means for receiving signaling configuring the device with a set of operations including one or more operations of the sequence of operations for the at least one neural network model. In some examples, the device may include a UE, a base station, a network entity, a relay device, a sidelink device, or an IAB node.

In some examples, the UE signal processing manager 830 may be configured as or otherwise support a means for receiving the indication of the sequence of operations for the signal processing procedure in the configuration message, where the configuration message includes a set of operations including all operations of the sequence of operations for the at least one neural network model.

In some examples, the UE signal processing manager 830 may be configured as or otherwise support a means for receiving a second configuration message for the device, the second configuration message indicating the at least one neural network model, the indication of the sequence of operations, and a set of operations including all operations of the sequence of operations for the at least one neural network model.

In some examples, the UE signal processing manager 830 may be configured as or otherwise support a means for receiving a set of input parameters, a set of output parameters, or both for one or more operations of the sequence of operations for the at least one neural network model.

In some examples, the UE model manager 825 may be configured as or otherwise support a means for receiving an indication of a mapping between the one or more neural network models and a set of operating conditions, where performing the signal processing procedure for the at least one neural network model using the signal received at the device according to the sequence of operations based on the mapping between the one or more neural network models and the set of operating conditions.

In some examples, the set of operating conditions includes a signal-to-noise ratio range, a bandwidth range, a signal scaling range, a channel delay profile, a signal peak range, or any combination thereof, associated with the signal received at the device.

In some examples, the UE capability manager 840 may be configured as or otherwise support a means for transmitting a message indicating a capability of the device to support one or more operations for one or more signal processing procedures, where receiving the indication of the sequence of operations for the signal processing procedure for the at least one neural network model is based on the capability of the device. In some examples, the sequence of operations includes one or more operations supported by the device.

In some examples, the message indicating the capability of the device to support the one or more operations for signal processing includes an indication of a threshold input dimension for each of the one or more operations for signal processing or a threshold run time for each of the one or more operations for signal processing.

In some examples, the UE signal processing manager 830 may be configured as or otherwise support a means for receiving RRC signaling or a MAC-CE that includes the indication of the sequence of operations.

In some examples, the UE signal processing manager 830 may be configured as or otherwise support a means for receiving an indication of one or more data formats associated with one or more operations of the sequence of operations, the one or more data formats including an XML data format, a JSON data format, or any combination thereof.

Figure 9:
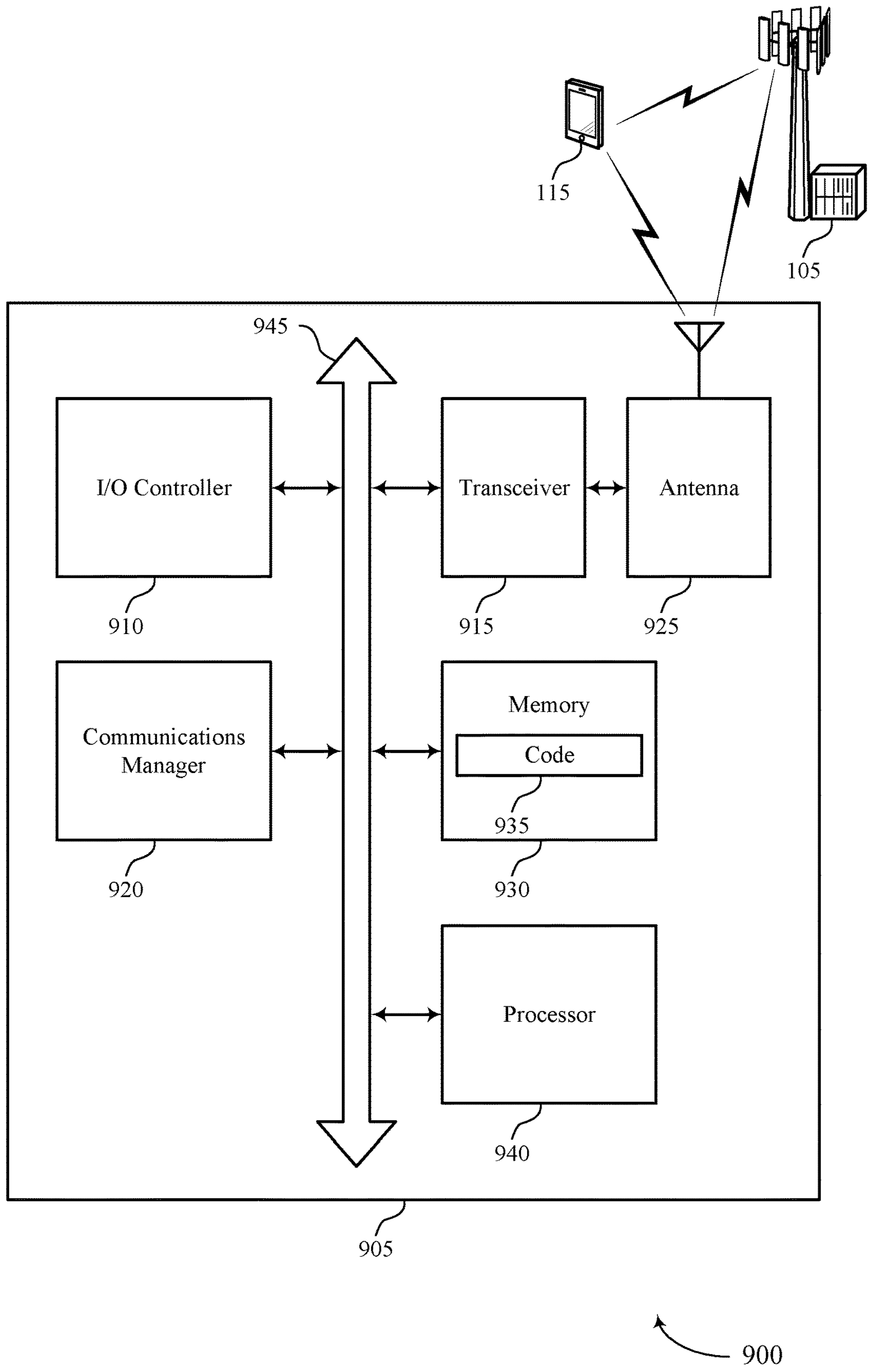
FIG. 9 shows a diagram of a system including a device that supports techniques for indicating signal processing procedures for network deployed neural network models in accordance with one or more aspects of the present disclosure.

FIG. 9 shows a diagram of a system 900 including a device 905 that supports techniques for indicating signal processing procedures for network deployed neural network models in accordance with one or more aspects of the present disclosure. The device 905 may be an example of or include the components of a device 605, a device 705, or a UE 115 as described herein. The device 905 may communicate wirelessly with one or more network entities 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for indicating signal processing procedures for network deployed neural network models). For example, the device 905 or a component of the device 905 may include a processor 940 and memory 930 coupled to the processor 940, the processor 940 and memory 930 configured to perform various functions described herein.

The communications manager 920 may support wireless communication at a device in a wireless network in accordance with examples as disclosed herein. For example, the communications manager 920 may be configured as or otherwise support a means for receiving a configuration message for the device, the configuration message indicating one or more neural network models for the device. The communications manager 920 may be configured as or otherwise support a means for receiving an indication of a sequence of operations for a signal processing procedure for at least one neural network model of the one or more neural network models, the signal processing procedure including one of an input pre-processing procedure associated with the at least one neural network model or an output pre-processing procedure associated with the at least one neural network model. The communications manager 920 may be configured as or otherwise support a means for performing the signal processing procedure for the at least one neural network model using a signal received at the device according to the sequence of operations.

By including or configuring the communications manager 920 in accordance with examples as described herein, the device 905 may support techniques for improved user experience related to reduced processing and reduced power consumption. The method described herein may support deployment of new neural network models which may improve performance over existing neural network models.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for indicating signal processing procedures for network deployed neural network models as described herein, or the processor 940 and the memory 930 may be otherwise configured to perform or support such operations.

Figure 10:
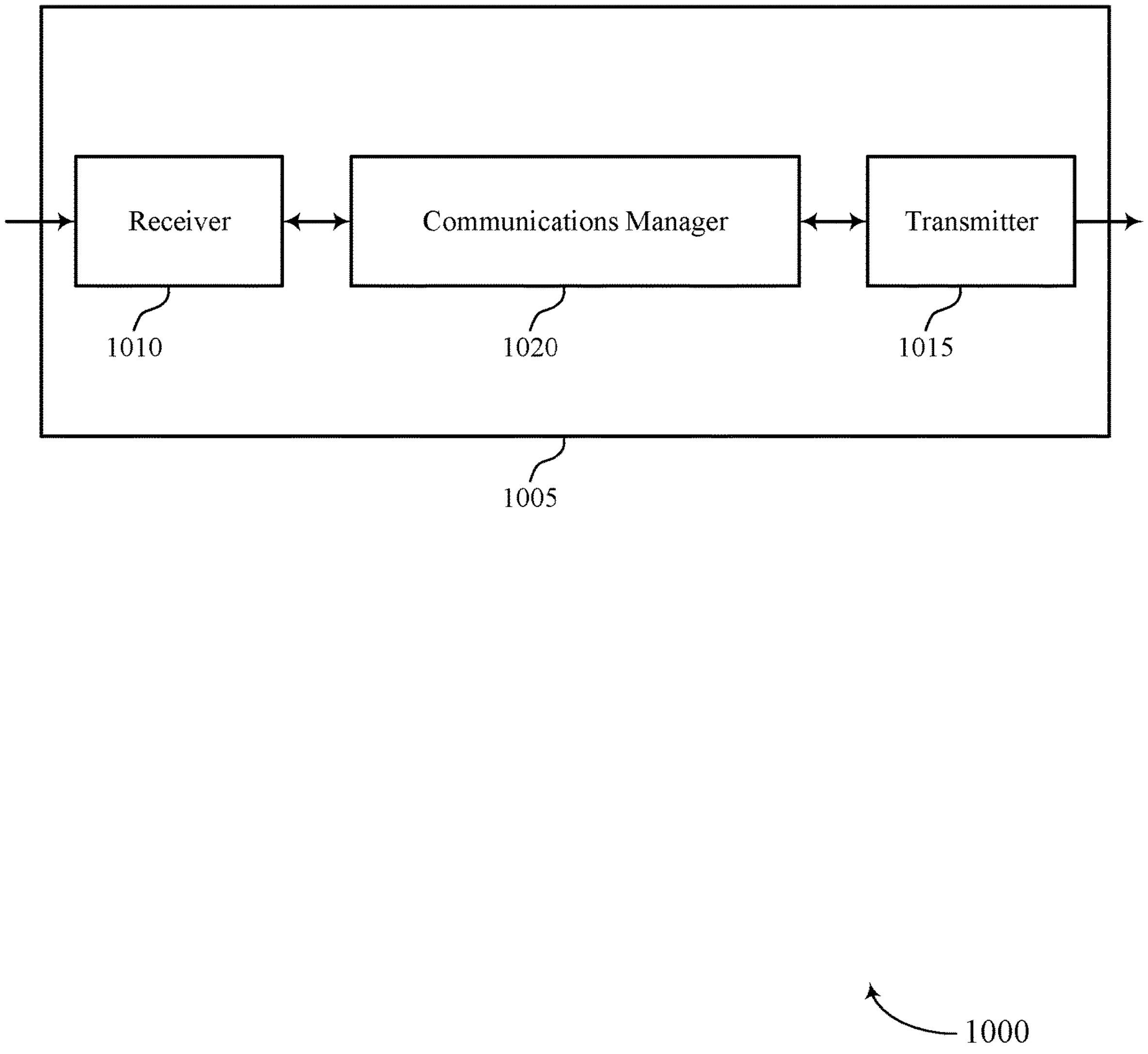
FIGS. 10 and 11 show block diagrams of devices that support techniques for indicating signal processing procedures for network deployed neural network models in accordance with one or more aspects of the present disclosure.

FIG. 10 shows a block diagram 1000 of a device 1005 that supports techniques for indicating signal processing procedures for network deployed neural network models in accordance with one or more aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for indicating signal processing procedures for network deployed neural network models). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for indicating signal processing procedures for network deployed neural network models). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of techniques for indicating signal processing procedures for network deployed neural network models as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. For example, the communications manager 1020 may be configured as or otherwise support a means for transmitting a configuration message to a device, the configuration message indicating one or more neural network models for the device. The communications manager 1020 may be configured as or otherwise support a means for transmitting an indication of a sequence of operations for a signal processing procedure for at least one neural network model of the one or more neural network models, the signal processing procedure including one of an input pre-processing procedure associated with the at least one neural network model or an output pre-processing procedure associated with the at least one neural network model. The communications manager 1020 may be configured as or otherwise support a means for transmitting a signal to the device based on transmitting the indication of the sequence of operations for the signal processing procedure for the at least one neural network model.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for reduced processing and reduced power consumption.

Figure 11:
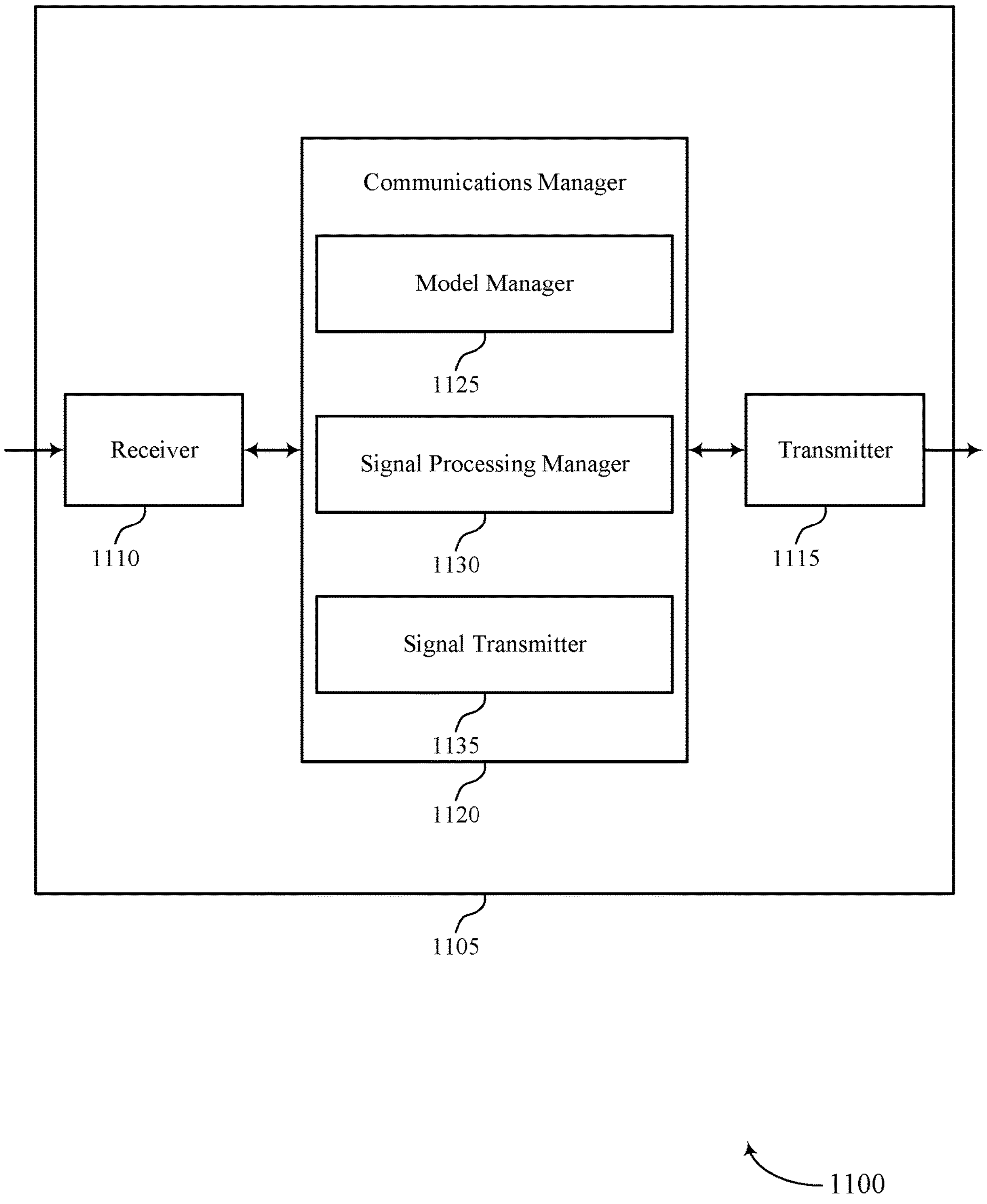

FIG. 11 shows a block diagram 1100 of a device 1105 that supports techniques for indicating signal processing procedures for network deployed neural network models in accordance with one or more aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for indicating signal processing procedures for network deployed neural network models). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for indicating signal processing procedures for network deployed neural network models). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of techniques for indicating signal processing procedures for network deployed neural network models as described herein. For example, the communications manager 1120 may include a model manager 1125, a signal processing manager 1130, a signal transmitter 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. The model manager 1125 may be configured as or otherwise support a means for transmitting a configuration message to a device, the configuration message indicating one or more neural network models for the device. The signal processing manager 1130 may be configured as or otherwise support a means for transmitting an indication of a sequence of operations for a signal processing procedure for at least one neural network model of the one or more neural network models, the signal processing procedure including one of an input pre-processing procedure associated with the at least one neural network model or an output pre-processing procedure associated with the at least one neural network model. The signal transmitter 1135 may be configured as or otherwise support a means for transmitting a signal to the device based on transmitting the indication of the sequence of operations for the signal processing procedure for the at least one neural network model.

Figure 12:
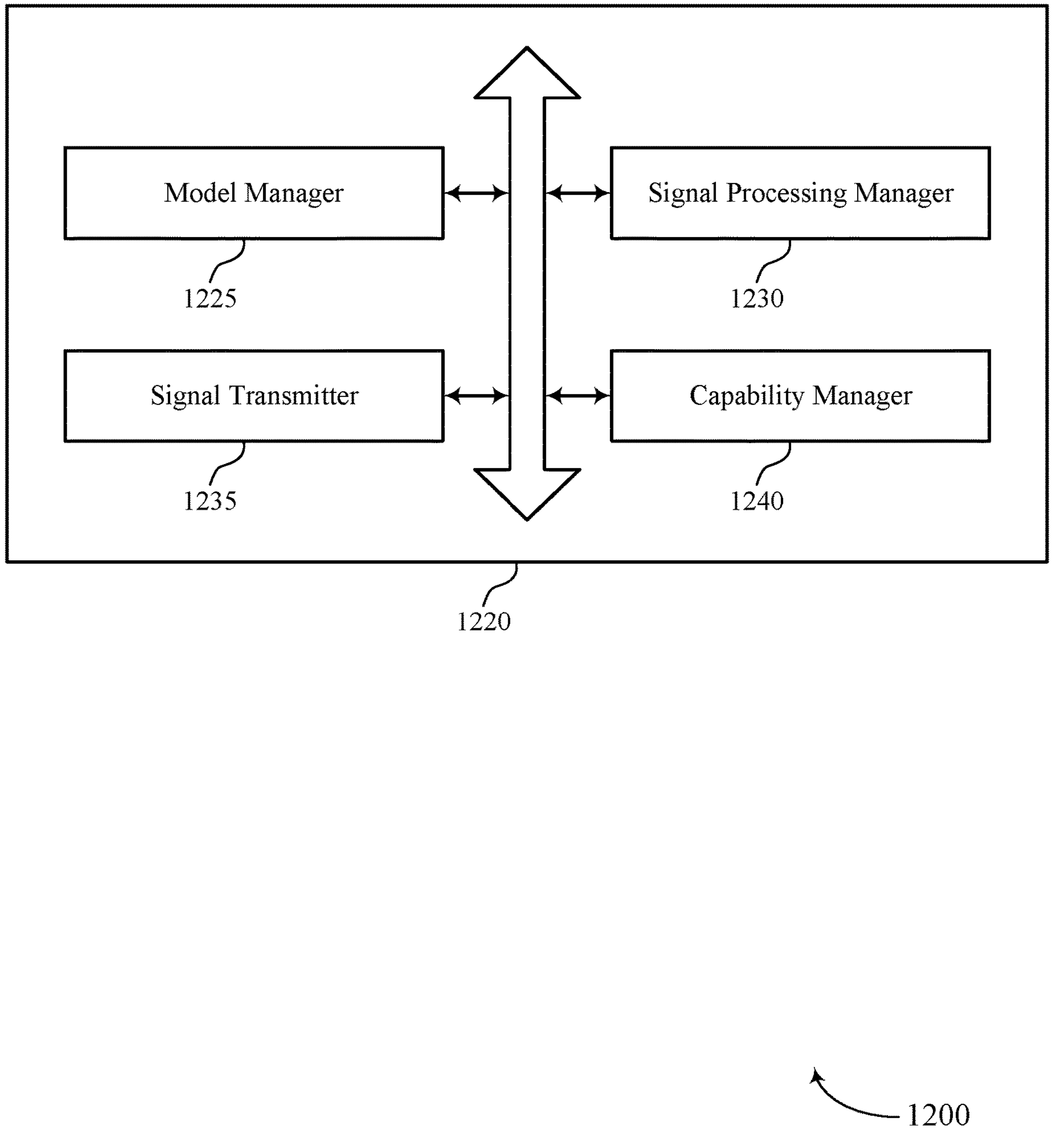
FIG. 12 shows a block diagram of a communications manager that supports techniques for indicating signal processing procedures for network deployed neural network models in accordance with one or more aspects of the present disclosure.

FIG. 12 shows a block diagram 1200 of a communications manager 1220 that supports techniques for indicating signal processing procedures for network deployed neural network models in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of techniques for indicating signal processing procedures for network deployed neural network models as described herein. For example, the communications manager 1220 may include a model manager 1225, a signal processing manager 1230, a signal transmitter 1235, a capability manager 1240, or any combination thereof. Each of these components may communicate, directly or indirectly, with one another (e.g., via one or more buses).

The communications manager 1220 may support wireless communication at a base station in accordance with examples as disclosed herein. The model manager 1225 may be configured as or otherwise support a means for transmitting a configuration message to a device, the configuration message indicating one or more neural network models for the device. The signal processing manager 1230 may be configured as or otherwise support a means for transmitting an indication of a sequence of operations for a signal processing procedure for at least one neural network model of the one or more neural network models, the signal processing procedure including one of an input pre-processing procedure associated with the at least one neural network model or an output pre-processing procedure associated with the at least one neural network model. The signal transmitter 1235 may be configured as or otherwise support a means for transmitting a signal to the device based on transmitting the indication of the sequence of operations for the signal processing procedure for the at least one neural network model.

In some examples, the signal processing manager 1230 may be configured as or otherwise support a means for transmitting signaling configuring the device with a set of operations including one or more operations of the sequence of operations for the at least one neural network model. In some examples, the device may include a UE, a base station, a network entity, a relay device, a sidelink device, or an IAB node In some examples, the signal processing manager 1230 may be configured as or otherwise support a means for receiving a second sequence of operations for a second signaling procedure performed at the base station.

In some examples, the signal processing manager 1230 may be configured as or otherwise support a means for transmitting the indication of the sequence of operations for the signal processing procedure in the configuration message, where the configuration message includes a set of operations including all operations of the sequence of operations for the at least one neural network model.

In some examples, the signal processing manager 1230 may be configured as or otherwise support a means for transmitting a second configuration message to the device, the second configuration message indicating the at least one neural network model, the indication of the sequence of operations, and a set of operations including all operations of the sequence of operations for the at least one neural network model.

In some examples, the signal processing manager 1230 may be configured as or otherwise support a means for transmitting a set of input parameters, a set of output parameters, or both for one or more operations of the sequence of operations for the at least one neural network model.

In some examples, the model manager 1225 may be configured as or otherwise support a means for transmitting an indication of a mapping between the one or more neural network models and a set of operating conditions.

In some examples, the set of operating conditions includes a signal-to-noise ratio range, a bandwidth range, a signal scaling range, a channel delay profile, a signal peak range, or any combination thereof, associated with the signal transmitted to the device.

In some examples, the capability manager 1240 may be configured as or otherwise support a means for receiving a message indicating a capability of the device to support one or more operations for one or more signal processing procedures where receiving the indication of the sequence of operations for the signal processing procedure for the at least one neural network model is based on the capability of the device.

In some examples, the sequence of operations includes one or more operations supported by the device.

In some examples, the message indicating the capability of the device to support the one or more operations for signal processing includes an indication of a threshold input dimension for each of the one or more operations for signal processing or a threshold run time for each of the one or more operations for signal processing.

In some examples, the signal processing manager 1230 may be configured as or otherwise support a means for transmitting RRC signaling or a MAC-CE) that includes the indication of the sequence of operations.

In some examples, the signal processing manager 1230 may be configured as or otherwise support a means for transmitting an indication of one or more data formats associated with one or more operations of the sequence of operations, the one or more data formats including an XML data format, a JSON data format, or any combination thereof.

Figure 13:
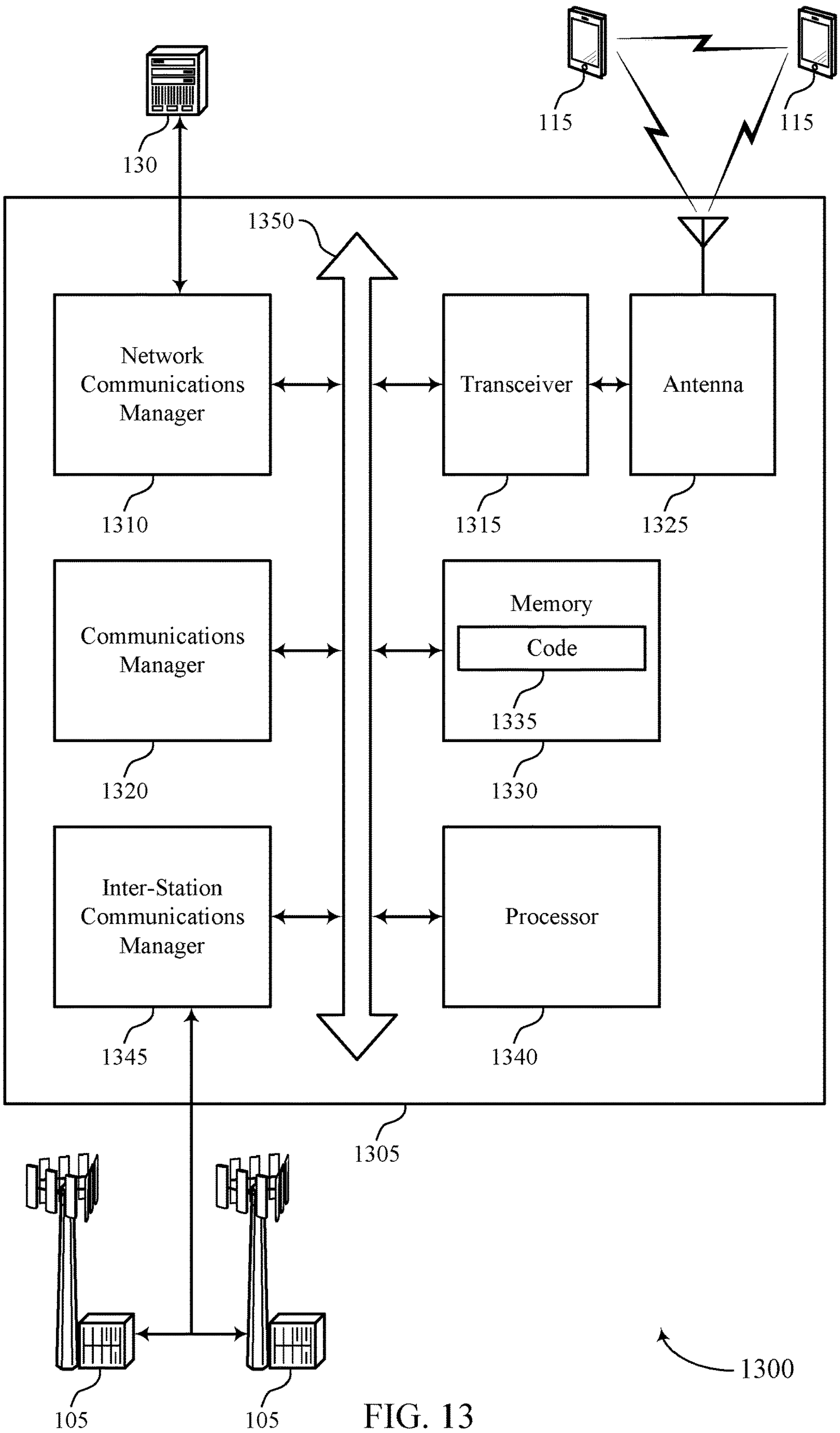
FIG. 13 shows a diagram of a system including a device that supports techniques for indicating signal processing procedures for network deployed neural network models in accordance with one or more aspects of the present disclosure.

FIG. 13 shows a diagram of a system 1300 including a device 1305 that supports techniques for indicating signal processing procedures for network deployed neural network models in accordance with one or more aspects of the present disclosure. The device 1305 may be an example of or include the components of a device 1005, a device 1105, or a base station 105 as described herein. The device 1305 may communicate wirelessly with one or more network entities 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1010, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting techniques for indicating signal processing procedures for network deployed neural network models). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other network entities 105, and may include a controller or scheduler for controlling communications with UEs 115 in cooperation with other network entities 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between network entities 105.

The communications manager 1320 may support wireless communication at a base station in accordance with examples as disclosed herein. For example, the communications manager 1320 may be configured as or otherwise support a means for transmitting a configuration message to a device, the configuration message indicating one or more neural network models for the device. The communications manager 1320 may be configured as or otherwise support a means for transmitting an indication of a sequence of operations for a signal processing procedure for at least one neural network model of the one or more neural network models, the signal processing procedure including one of an input pre-processing procedure associated with the at least one neural network model or an output pre-processing procedure associated with the at least one neural network model. The communications manager 1320 may be configured as or otherwise support a means for transmitting a signal to the device based on transmitting the indication of the sequence of operations for the signal processing procedure for the at least one neural network model.

By including or configuring the communications manager 1320 in accordance with examples as described herein, the device 1305 may support techniques for improved user experience related to reduced processing and reduced power consumption.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of techniques for indicating signal processing procedures for network deployed neural network models as described herein, or the processor 1340 and the memory 1330 may be otherwise configured to perform or support such operations.

Figure 14:
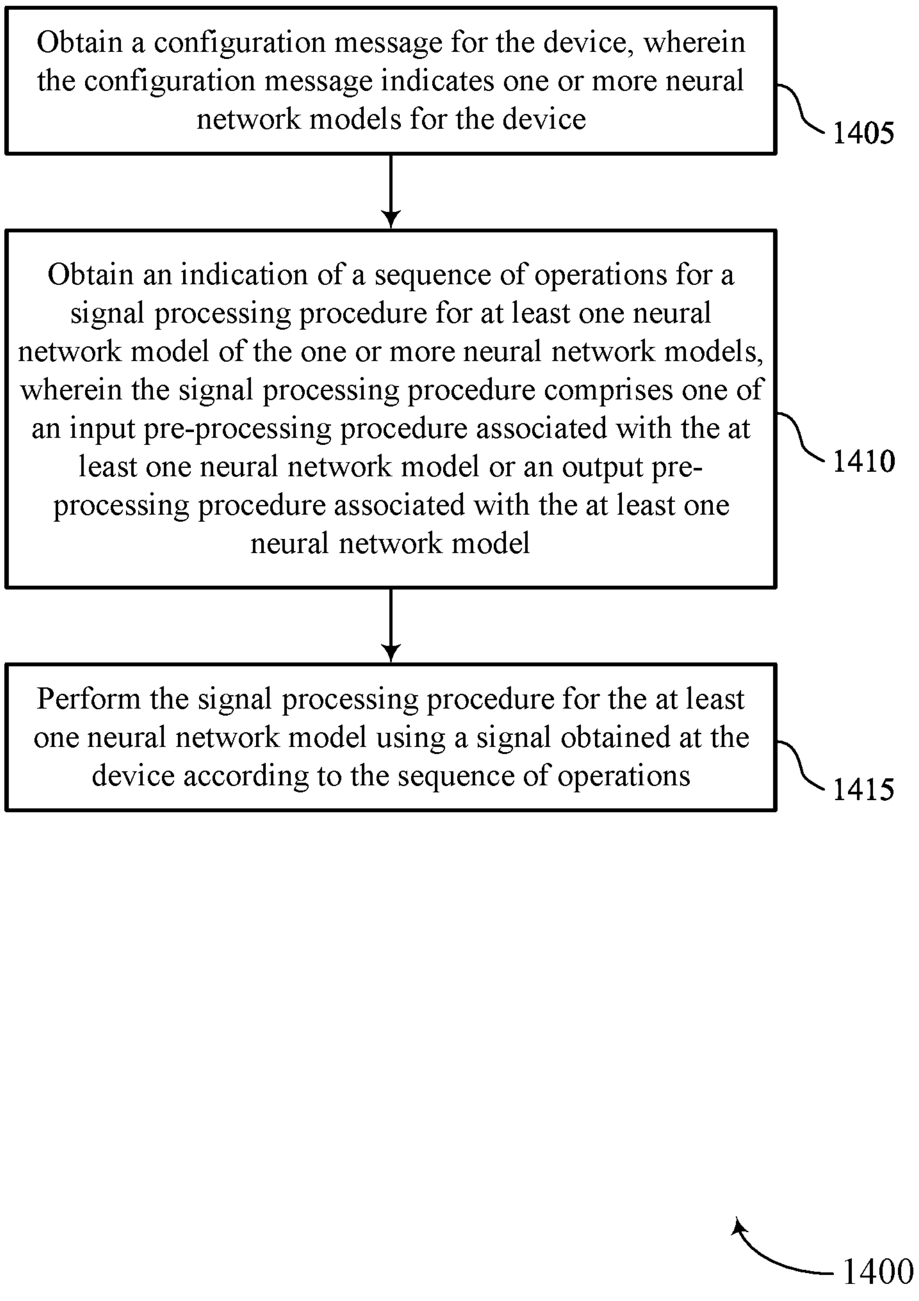
FIGS. 14 through 19 show flowcharts illustrating methods that support techniques for indicating signal processing procedures for network deployed neural network models in accordance with one or more aspects of the present disclosure.

FIG. 14 shows a flowchart illustrating a method 1400 that supports techniques for indicating signal processing procedures for network deployed neural network models in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include obtaining (e.g., receiving) a configuration message for the device, where the configuration message indicates one or more neural network models for the device. The operations of 1405 may be performed in accordance with examples as disclosed herein.

In some examples, aspects of the operations of 1405 may be performed by a UE model manager 825 as described with reference to FIG. 8.

At 1410, the method may include obtaining an indication of a sequence of operations for a signal processing procedure for at least one neural network model of the one or more neural network models, where the signal processing procedure includes one of an input pre-processing procedure associated with the at least one neural network model or an output pre-processing procedure associated with the at least one neural network model. The operations of 1410 may be performed in accordance with examples as disclosed herein. In some examples, aspects of the operations of 1410 may be performed by a UE signal processing manager 830 as described with reference to FIG. 8.

At 1415, the method may include performing the signal processing procedure for the at least one neural network model using a signal obtained at the device according to the sequence of operations. The operations of 1415 may be performed in accordance with examples as disclosed herein. In some examples, aspects of the operations of 1415 may be performed by an execution component 835 as described with reference to FIG. 8.

Figure 15:
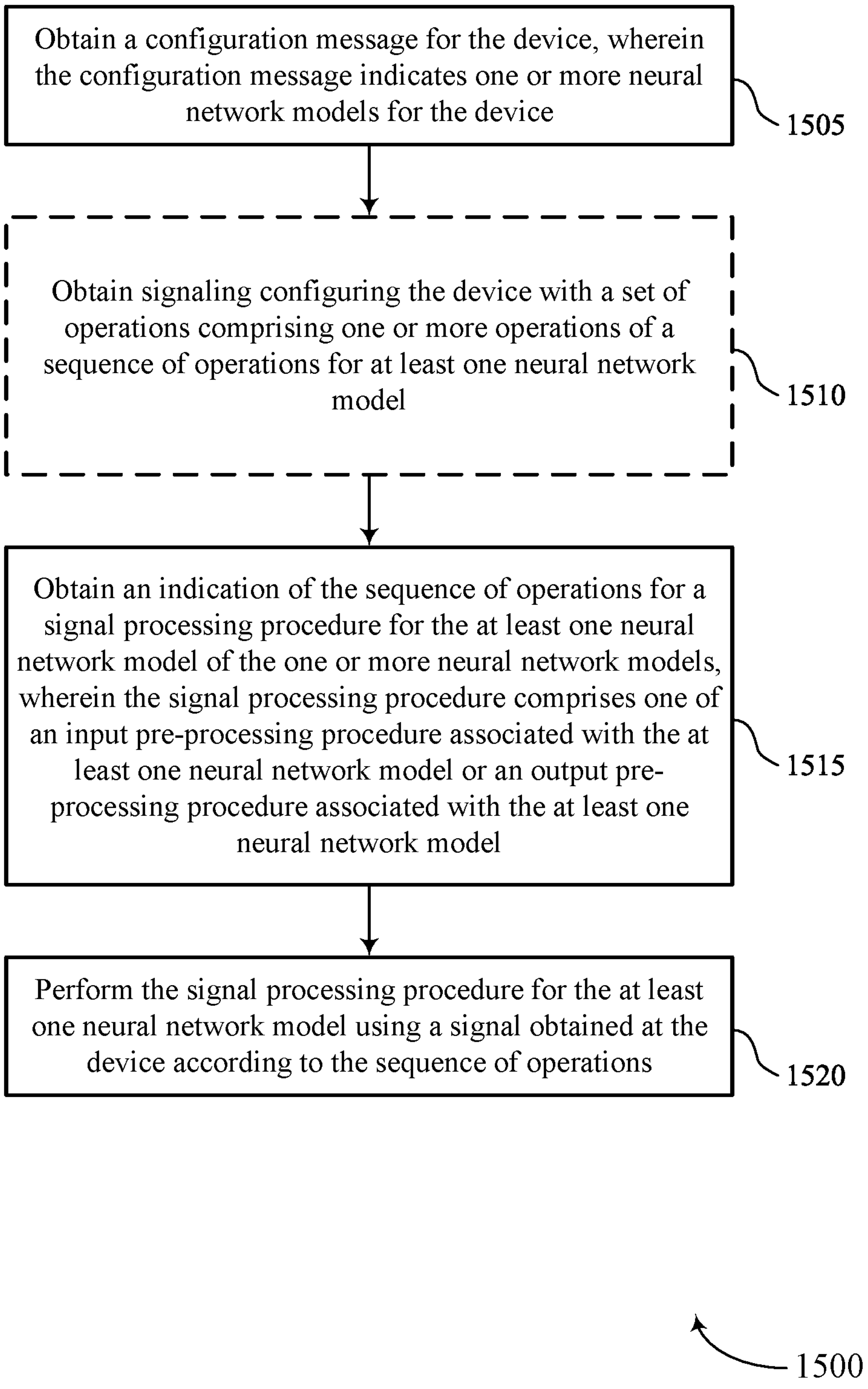

FIG. 15 shows a flowchart illustrating a method 1500 that supports techniques for indicating signal processing procedures for network deployed neural network models in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include obtaining (e.g., receiving) a configuration message for the device, where the configuration message indicates one or more neural network models for the device. The operations of 1505 may be performed in accordance with examples as disclosed herein. In some examples, aspects of the operations of 1505 may be performed by a UE model manager 825 as described with reference to FIG. 8.

At 1510, the method may optionally include obtaining signaling configuring the device with a set of operations including one or more operations of a sequence of operations for at least one neural network model. The operations of 1510 may be performed in accordance with examples as disclosed herein. In some examples, aspects of the operations of 1510 may be performed by a UE signal processing manager 830 as described with reference to FIG. 8.

At 1515, the method may include obtaining an indication of the sequence of operations for a signal processing procedure for the at least one neural network model of the one or more neural network models, where the signal processing procedure includes one of an input pre-processing procedure associated with the at least one neural network model or an output pre-processing procedure associated with the at least one neural network model. The operations of 1515 may be performed in accordance with examples as disclosed herein. In some examples, aspects of the operations of 1515 may be performed by a UE signal processing manager 830 as described with reference to FIG. 8.

At 1520, the method may include performing the signal processing procedure for the at least one neural network model using a signal obtained at the device according to the sequence of operations. The operations of 1520 may be performed in accordance with examples as disclosed herein. In some examples, aspects of the operations of 1520 may be performed by an execution component 835 as described with reference to FIG. 8.

Figure 16:
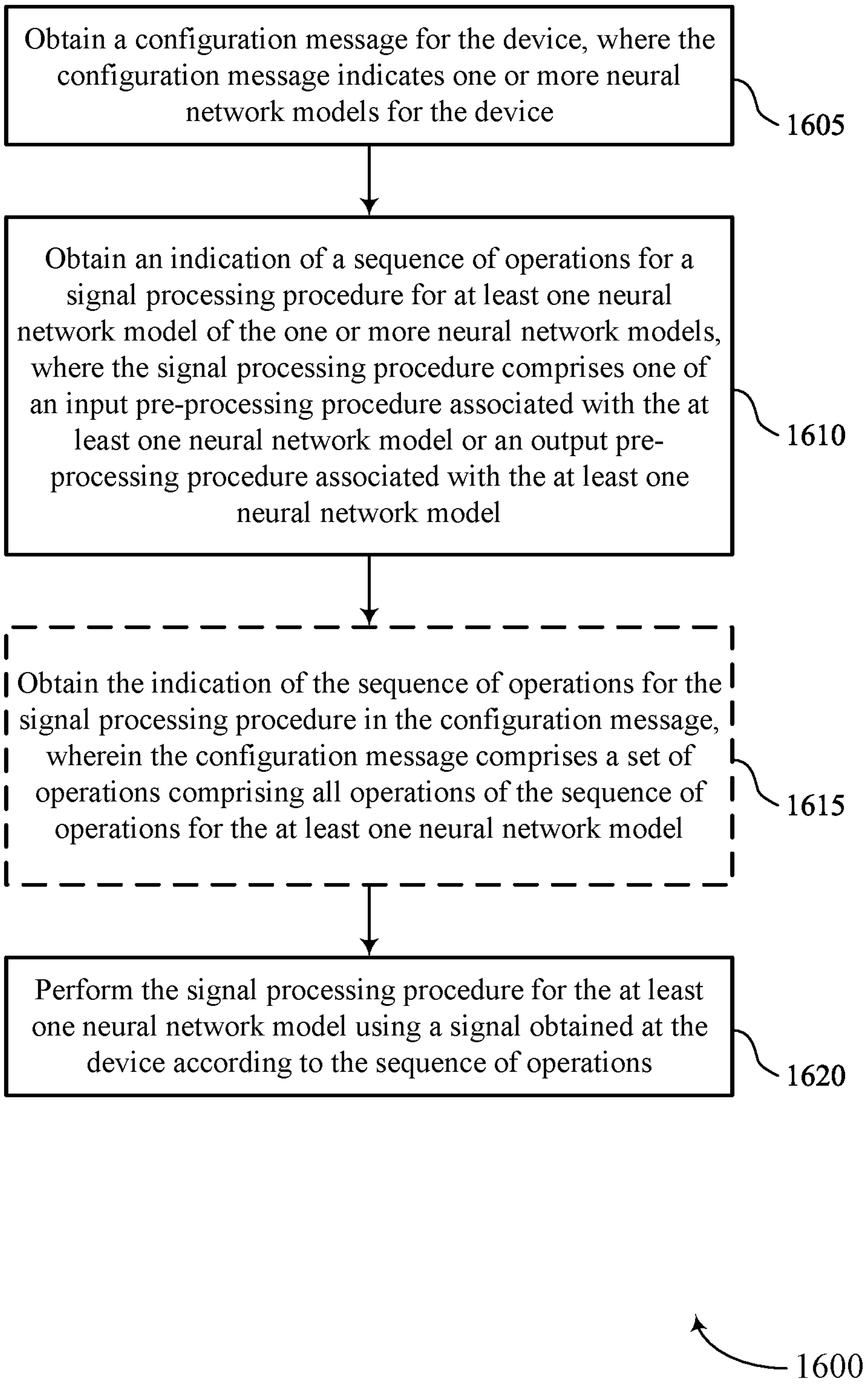

FIG. 16 shows a flowchart illustrating a method 1600 that supports techniques for indicating signal processing procedures for network deployed neural network models in accordance with one or more aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include obtaining (e.g., receiving) a configuration message for the device, where the configuration message indicates one or more neural network models for the device. The operations of 1605 may be performed in accordance with examples as disclosed herein. In some examples, aspects of the operations of 1605 may be performed by a UE model manager 825 as described with reference to FIG. 8.

At 1610, the method may include obtaining an indication of a sequence of operations for a signal processing procedure for at least one neural network model of the one or more neural network models, where the signal processing procedure includes one of an input pre-processing procedure associated with the at least one neural network model or an output pre-processing procedure associated with the at least one neural network model. The operations of 1610 may be performed in accordance with examples as disclosed herein. In some examples, aspects of the operations of 1610 may be performed by a UE signal processing manager 830 as described with reference to FIG. 8.

At 1615, the method may optionally include obtaining the indication of the sequence of operations for the signal processing procedure in the configuration message, where the configuration message includes a set of operations including all operations of the sequence of operations for the at least one neural network model. The operations of 1615 may be performed in accordance with examples as disclosed herein. In some examples, aspects of the operations of 1615 may be performed by a UE signal processing manager 830 as described with reference to FIG. 8.

At 1620, the method may include performing the signal processing procedure for the at least one neural network model using a signal obtained at the device according to the sequence of operations. The operations of 1620 may be performed in accordance with examples as disclosed herein. In some examples, aspects of the operations of 1620 may be performed by an execution component 835 as described with reference to FIG. 8.

Figure 17:
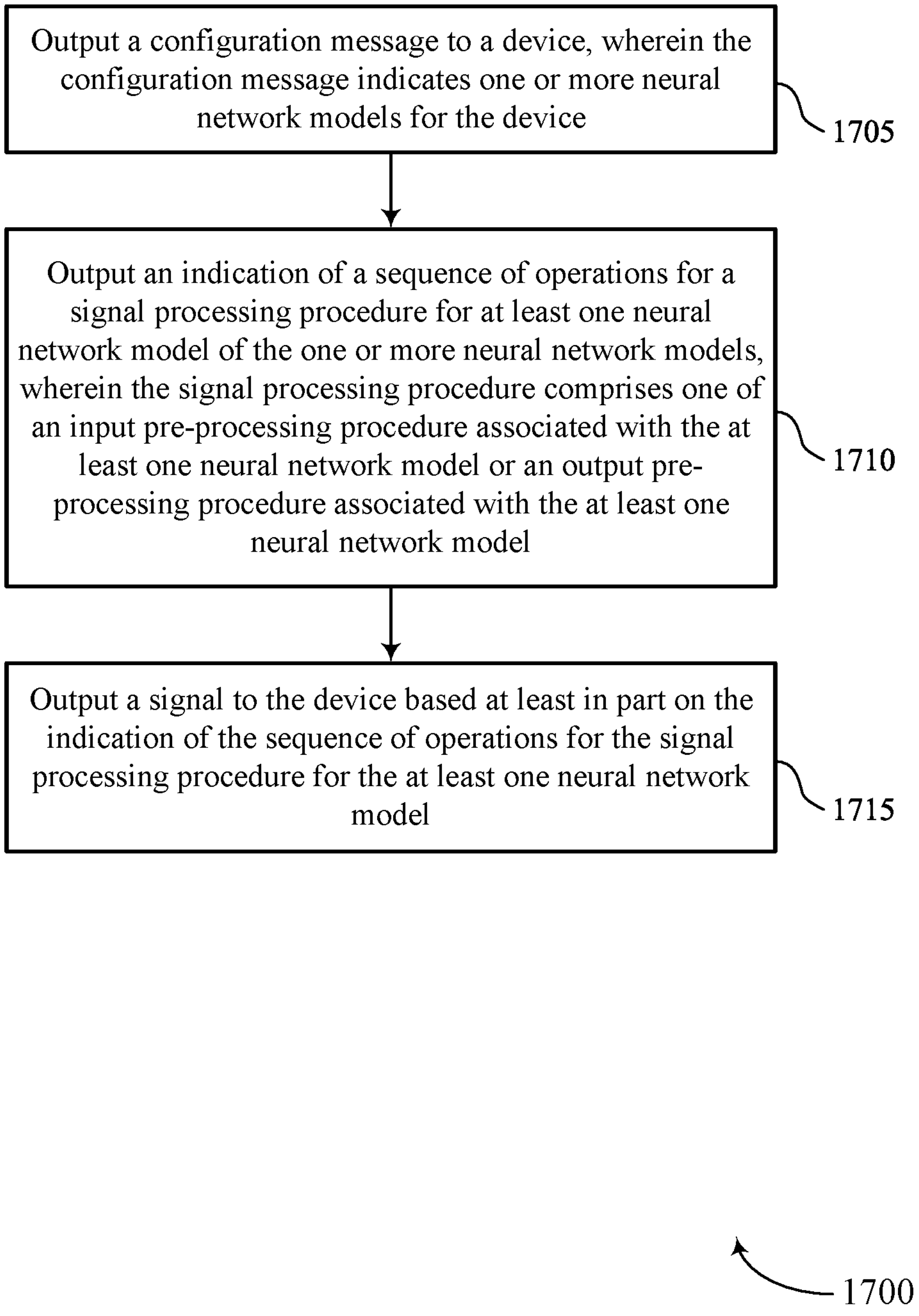

FIG. 17 shows a flowchart illustrating a method 1700 that supports techniques for indicating signal processing procedures for network deployed neural network models in accordance with one or more aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1705, the method may include outputting (e.g., transmitting, providing) a configuration message to a device, where the configuration message indicates one or more neural network models for the device. The operations of 1705 may be performed in accordance with examples as disclosed herein. In some examples, aspects of the operations of 1705 may be performed by a model manager 1225 as described with reference to FIG. 12.

At 1710, the method may include outputting an indication of a sequence of operations for a signal processing procedure for at least one neural network model of the one or more neural network models, where the signal processing procedure includes one of an input pre-processing procedure associated with the at least one neural network model or an output pre-processing procedure associated with the at least one neural network model. The operations of 1710 may be performed in accordance with examples as disclosed herein. In some examples, aspects of the operations of 1710 may be performed by a signal processing manager 1230 as described with reference to FIG. 12.

At 1715, the method may include outputting a signal to the device based on the indication of the sequence of operations for the signal processing procedure for the at least one neural network model. The operations of 1715 may be performed in accordance with examples as disclosed herein. In some examples, aspects of the operations of 1715 may be performed by a signal transmitter 1235 as described with reference to FIG. 12.

Figure 18:
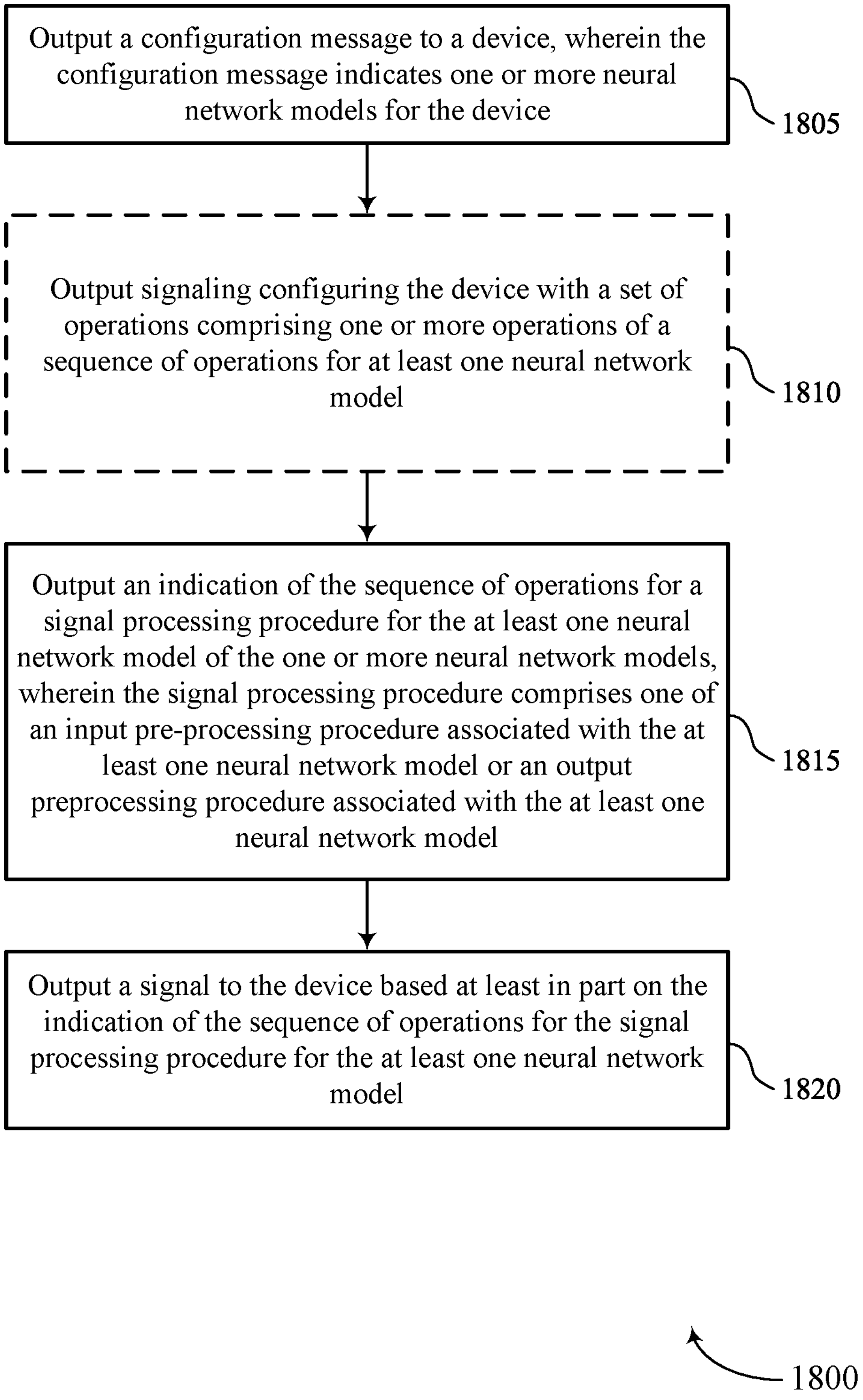

FIG. 18 shows a flowchart illustrating a method 1800 that supports techniques for indicating signal processing procedures for network deployed neural network models in accordance with one or more aspects of the present disclosure. The operations of the method 1800 may be implemented by a base station or its components as described herein. For example, the operations of the method 1800 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1805, the method may include outputting (e.g., transmitting, providing) a configuration message to a device, where the configuration message indicates one or more neural network models for the device. The operations of 1805 may be performed in accordance with examples as disclosed herein. In some examples, aspects of the operations of 1805 may be performed by a model manager 1225 as described with reference to FIG. 12.

At 1810, the method may optionally include outputting signaling configuring the device with a set of operations including one or more operations of a sequence of operations for at least one neural network model. The operations of 1810 may be performed in accordance with examples as disclosed herein. In some examples, aspects of the operations of 1810 may be performed by a signal processing manager 1230 as described with reference to FIG. 12.

At 1815, the method may include outputting an indication of the sequence of operations for a signal processing procedure for the at least one neural network model of the one or more neural network models, where the signal processing procedure includes one of an input pre-processing procedure associated with the at least one neural network model or an output pre-processing procedure associated with the at least one neural network model. The operations of 1815 may be performed in accordance with examples as disclosed herein. In some examples, aspects of the operations of 1815 may be performed by a signal processing manager 1230 as described with reference to FIG. 12.

At 1820, the method may include outputting a signal to the device based on the indication of the sequence of operations for the signal processing procedure for the at least one neural network model. The operations of 1820 may be performed in accordance with examples as disclosed herein. In some examples, aspects of the operations of 1820 may be performed by a signal transmitter 1235 as described with reference to FIG. 12.

Figure 19:
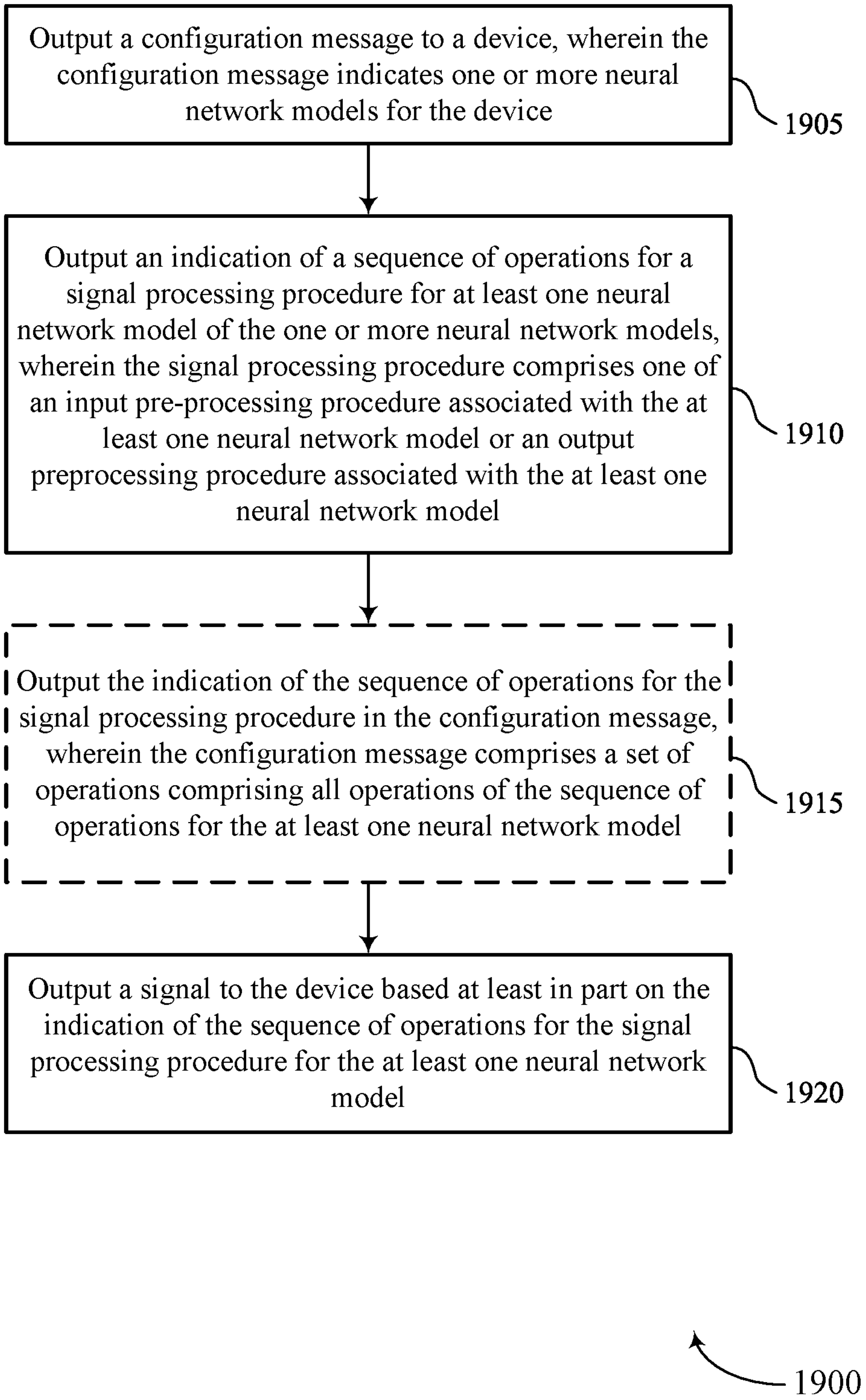

FIG. 19 shows a flowchart illustrating a method 1900 that supports techniques for indicating signal processing procedures for network deployed neural network models in accordance with one or more aspects of the present disclosure. The operations of the method 1900 may be implemented by a base station or its components as described herein. For example, the operations of the method 1900 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1905, the method may include outputting (e.g., transmitting, providing) a configuration message to a device, where the configuration message indicates one or more neural network models for the device. The operations of 1905 may be performed in accordance with examples as disclosed herein. In some examples, aspects of the operations of 1905 may be performed by a model manager 1225 as described with reference to FIG. 12.

At 1910, the method may include outputting an indication of a sequence of operations for a signal processing procedure for at least one neural network model of the one or more neural network models, where the signal processing procedure includes one of an input pre-processing procedure associated with the at least one neural network model or an output pre-processing procedure associated with the at least one neural network model. The operations of 1910 may be performed in accordance with examples as disclosed herein. In some examples, aspects of the operations of 1910 may be performed by a signal processing manager 1230 as described with reference to FIG. 12.

At 1915, the method may optionally include outputting the indication of the sequence of operations for the signal processing procedure in the configuration message, where the configuration message includes a set of operations including all operations of the sequence of operations for the at least one neural network model. The operations of 1915 may be performed in accordance with examples as disclosed herein. In some examples, aspects of the operations of 1915 may be performed by a signal processing manager 1230 as described with reference to FIG. 12.

At 1920, the method may include outputting a signal to the device based on the indication of the sequence of operations for the signal processing procedure for the at least one neural network model. The operations of 1920 may be performed in accordance with examples as disclosed herein. In some examples, aspects of the operations of 1920 may be performed by a signal transmitter 1235 as described with reference to FIG. 12.

The following provides an overview of aspects of the present disclosure:

Aspect 1: A method for wireless communication at a device in a wireless network, comprising: obtaining a configuration message for the device, wherein the configuration message indicates one or more neural network models for the device; obtaining an indication of a sequence of operations for a signal processing procedure for at least one neural network model of the one or more neural network models, wherein the signal processing procedure comprises one of an input pre-processing procedure associated with the at least one neural network model or an output pre-processing procedure associated with the at least one neural network model; and performing the signal processing procedure for the at least one neural network model using a signal obtained at the device according to the sequence of operations.

Aspect 2: The method of aspect 1, further comprising: obtaining signaling that configures the device with a set of operations comprising one or more operations of the sequence of operations for the at least one neural network model.

Aspect 3: The method of any of aspects 1 through 2, wherein obtaining the indication of the sequence of operations comprises: obtaining the indication of the sequence of operations for the signal processing procedure in the configuration message, wherein the configuration message comprises a set of operations comprising all operations of the sequence of operations for the at least one neural network model.

Aspect 4: The method of any of aspects 1 through 3, wherein obtaining the indication of the sequence of operations comprises: obtaining a second configuration message for the device, wherein the second configuration message indicates the at least one neural network model, the indication of the sequence of operations, and a set of operations comprising all operations of the sequence of operations for the at least one neural network model.

Aspect 5: The method of any of aspects 1 through 4, wherein obtaining the indication of the sequence of operations comprises: obtaining a set of input parameters, a set of output parameters, or both for one or more operations of the sequence of operations for the at least one neural network model.

Aspect 6: The method of any of aspects 1 through 5, further comprising: obtaining an indication of a mapping between the one or more neural network models and a set of operating conditions, wherein the signal processing procedure for the at least one neural network model is performed using the signal obtained at the device according to the sequence of operations based at least in part on the mapping between the one or more neural network models and the set of operating conditions.

Aspect 7: The method of aspect 6, wherein the set of operating conditions comprises a signal-to-noise ratio range, a bandwidth range, a signal scaling range, a channel delay profile, a signal peak range, or any combination thereof, associated with the signal obtained at the device.

Aspect 8: The method of any of aspects 1 through 7, further comprising: outputting a message that indicates a capability of the device to support one or more operations for one or more signal processing procedures wherein the indication of the sequence of operations for the signal processing procedure for the at least one neural network model is obtained based at least in part on the capability of the device.

Aspect 9: The method of aspect 8, wherein the sequence of operations comprises one or more operations supported by the device.

Aspect 10: The method of any of aspects 8 through 9, wherein the message that indicates the capability of the device to support the one or more operations for the one or more signal processing procedures comprises an indication of a threshold input dimension for each of the one or more operations for the one or more signal processing procedures or a threshold run time for each of the one or more operations for the one or more signal processing procedures.

Aspect 11: The method of any of aspects 1 through 10, wherein obtaining the indication of the sequence of operations comprises: obtaining RRC signaling or a MAC-CE that comprises the indication of the sequence of operations.

Aspect 12: The method of any of aspects 1 through 11, further comprising: obtaining an indication of one or more data formats associated with one or more operations of the sequence of operations, wherein the one or more data formats comprise an XML data format, a JSON data format, or any combination thereof.

Aspect 13: The method of any of aspects 1 through 12, wherein the device comprises a UE, a base station, a network entity, a relay device, a sidelink device, or an IAB node.

Aspect 14: An method for wireless communication at a network entity, comprising: outputting a configuration message to a device, wherein the configuration message indicates one or more neural network models for the device; outputting an indication of a sequence of operations for a signal processing procedure for at least one neural network model of the one or more neural network models, wherein the signal processing procedure comprises one of an input pre-processing procedure associated with the at least one neural network model or an output pre-processing procedure associated with the at least one neural network model; and outputting a signal to the device based at least in part on the indication of the sequence of operations for the signal processing procedure for the at least one neural network model.

Aspect 15: The method of aspect 14, further comprising: outputting signaling that configures the device with a set of operations comprising one or more operations of the sequence of operations for the at least one neural network model.

Aspect 16: The method of any of aspects 14 through 15, further comprising: obtain a second sequence of operations for a second signaling procedure performed at the network entity.

Aspect 17: The method of any of aspects 14 through 16, wherein outputting the indication of the sequence of operations comprises: outputting the indication of the sequence of operations for the signal processing procedure in the configuration message, wherein the configuration message comprises a set of operations comprising all operations of the sequence of operations for the at least one neural network model.

Aspect 18: The method of any of aspects 14 through 17, wherein outputting the indication of the sequence of operations comprises: outputting a second configuration message to the device, wherein the second configuration message indicates the at least one neural network model, the indication of the sequence of operations, and a set of operations comprising all operations of the sequence of operations for the at least one neural network model.

Aspect 19: The method of any of aspects 14 through 18, wherein outputting the indication of the sequence of operations comprises: outputting a set of input parameters, a set of output parameters, or both for one or more operations of the sequence of operations for the at least one neural network model.

Aspect 20: The method of any of aspects 14 through 19, further comprising: outputting an indication of a mapping between the one or more neural network models and a set of operating conditions.

Aspect 21: The method of aspect 20, wherein the set of operating conditions comprises a signal-to-noise ratio range, a bandwidth range, a signal scaling range, a channel delay profile, a signal peak range, or any combination thereof, associated with the signal transmitted to the device.

Aspect 22: The method of any of aspects 14 through 21, further comprising: obtaining a message that indicates a capability of the device to support one or more operations for one or more signal processing procedures wherein obtaining the indication of the sequence of operations for the signal processing procedure for the at least one neural network model is based at least in part on the capability of the device.

Aspect 23: The method of aspect 22, wherein the sequence of operations comprises one or more operations supported by the device.

Aspect 24: The method of any of aspects 22 through 23, wherein the message that indicates the capability of the device to support the one or more operations for the one or more signal processing procedures comprises an indication of a threshold input dimension for each of the one or more operations for the one or more signal processing procedures or a threshold run time for each of the one or more operations for the one or more signal processing procedures.

Aspect 25: The method of any of aspects 14 through 24, wherein outputting the indication of the sequence of operations comprises: outputting RRC signaling or a MAC-CE that comprises the indication of the sequence of operations.

Aspect 26: The method of any of aspects 14 through 25, further comprising: outputting an indication of one or more data formats associated with one or more operations of the sequence of operations, wherein the one or more data formats comprise an XML data format, a JSON data format, or any combination thereof.

Aspect 27: The method of any of aspects 14 through 26, wherein the device comprises a UE, a base station, a network entity, a relay device, a sidelink device, or an IAB node.

Aspect 28: An apparatus for wireless communication at a device in a wireless network, comprising a processor and memory coupled with the processor; where the processor is configured to cause the apparatus to perform a method of any of aspects 1 through 13.

Aspect 29: An apparatus for wireless communication at a device in a wireless network, comprising at least one means for performing a method of any of aspects 1 through 13.

Aspect 30: A non-transitory computer-readable medium storing code for wireless communication at a device in a wireless network, the code comprising instructions executable by a processor to perform a method of any of aspects 1 through 13.

Aspect 31: An apparatus for wireless communication at a network entity, comprising a processor and memory coupled with the processor, where the processor is configured to cause the apparatus to perform a method of any of aspects 14 through 27.

Aspect 32: An apparatus for wireless communication at a network entity, comprising at least one means for performing a method of any of aspects 14 through 27.

Aspect 33: A non-transitory computer-readable medium storing code for wireless communication at a network entity, the code comprising instructions executable by a processor to perform a method of any of aspects 14 through 27.

Aspect 34: A method for wireless communication at a device in a wireless network, comprising: receiving a configuration message for the device, the configuration message indicating one or more neural network models for the device; receiving an indication of a sequence of operations for a signal processing procedure for at least one neural network model of the one or more neural network models, the signal processing procedure comprising one of an input pre-processing procedure associated with the at least one neural network model or an output pre-processing procedure associated with the at least one neural network model; and performing the signal processing procedure for the at least one neural network model using a signal received at the device according to the sequence of operations.

Aspect 35: The method of aspect 34, further comprising: receiving signaling configuring the device with a set of operations comprising one or more operations of the sequence of operations for the at least one neural network model.

Aspect 36: The method of any of aspects 34 through, the receiving the indication of the sequence of operations comprising: receiving the indication of the sequence of operations for the signal processing procedure in the configuration message, wherein the configuration message comprises a set of operations comprising all operations of the sequence of operations for the at least one neural network model.

Aspect 37: The method of any of aspects 34 through 36, the receiving the indication of the sequence of operations comprising: receiving a second configuration message for the device, the second configuration message indicating the at least one neural network model, the indication of the sequence of operations, and a set of operations comprising all operations of the sequence of operations for the at least one neural network model.

Aspect 38: The method of any of aspects 34 through 37, the receiving the indication of the sequence of operations comprising: receiving a set of input parameters, a set of output parameters, or both for one or more operations of the sequence of operations for the at least one neural network model.

Aspect 39: The method of any of aspects 34 through 38, further comprising: receiving an indication of a mapping between the one or more neural network models and a set of operating conditions, wherein performing the signal processing procedure for the at least one neural network model using the signal received at the device according to the sequence of operations based at least in part on the mapping between the one or more neural network models and the set of operating conditions.

Aspect 40: The method of aspect 39, wherein the set of operating conditions comprises an SNR range, a bandwidth range, a signal scaling range, a channel delay profile, a signal peak range, or any combination thereof, associated with the signal received at the device.

Aspect 41: The method of any of aspects 34 through 40, further comprising: transmitting a message indicating a capability of the device to support one or more operations for signal processing, wherein receiving the indication of the sequence of operations for the signal processing procedure for the at least one neural network model is based at least in part on the capability of the device.

Aspect 42: The method of aspect 41, wherein the sequence of operations comprises operations supported by the device.

Aspect 43: The method of any of aspects 41 through 42, wherein the message indicating the capability of the device to support the one or more operations for signal processing comprises an indication of a threshold input dimension for each of the one or more operations for signal processing or a threshold run time for each of the one or more operations for signal processing.

Aspect 44: The method of any of aspects 34 through 43, the receiving the indication of the sequence of operations comprising: receiving RRC signaling or a MAC-CE that comprises the indication of the sequence of operations.

Aspect 45: The method of any of aspects 34 through 44, further comprising: receiving an indication of one or more data formats associated with one or more operations of the sequence of operations, the one or more data formats comprising an XML data format, a JSON data format, or any combination thereof.

Aspect 46: The method of any of aspects 34 through 45, wherein the device comprises a UE, a base station, a network entity, a relay device, a sidelink device, or an IAB node.

Aspect 47: A method for wireless communication at a base station, comprising: transmitting a configuration message to a device, the configuration message indicating one or more neural network models for the device; transmitting an indication of a sequence of operations for a signal processing procedure for at least one neural network model of the one or more neural network models, the signal processing procedure comprising one of an input pre-processing procedure associated with the at least one neural network model or an output pre-processing procedure associated with the at least one neural network model; and transmitting a signal to the device based at least in part on transmitting the indication of the sequence of operations for the signal processing procedure for the at least one neural network model.

Aspect 48: The method of aspect 47, further comprising: transmitting signaling configuring the device with a set of operations comprising one or more operations of the sequence of operations for the at least one neural network model.

Aspect 49: The method of any of aspects 47 through 48, further comprising: receiving a second sequence of operations for a second signaling procedure performed at the base station.

Aspect 50: The method of any of aspects 47 through 49, the transmitting the indication of the sequence of operations comprising: transmitting the indication of the sequence of operations for the signal processing procedure in the configuration message, wherein the configuration message comprises a set of operations comprising all operations of the sequence of operations for the at least one neural network model.

Aspect 51: The method of any of aspects 47 through 50, the transmitting the indication of the sequence of operations comprising: transmitting a second configuration message to the device, the second configuration message indicating the at least one neural network model, the indication of the sequence of operations, and a set of operations comprising all operations of the sequence of operations for the at least one neural network model.

Aspect 52: The method of any of aspects 47 through 51, the transmitting the indication of the sequence of operations comprising: transmitting a set of input parameters, a set of output parameters, or both for one or more operations of the sequence of operations for the at least one neural network model.

Aspect 53: The method of any of aspects 47 through 52, further comprising: transmitting an indication of a mapping between the one or more neural network models and a set of operating conditions.

Aspect 54: The method of aspect 53, wherein the set of operating conditions comprises an SNR range, a bandwidth range, a signal scaling range, a channel delay profile, a signal peak range, or any combination thereof, associated with the signal transmitted to the device.

Aspect 55: The method of any of aspects 47 through 54, further comprising: receiving a message indicating a capability of the device to support one or more operations for signal processing, wherein receiving the indication of the sequence of operations for the signal processing procedure for the at least one neural network model is based at least in part on the capability of the device.

Aspect 56: The method of aspect 55, wherein the sequence of operations comprises operations supported by the device.

Aspect 57: The method of any of aspects 55 through 56, wherein the message indicating the capability of the device to support the one or more operations for signal processing comprises an indication of a threshold input dimension for each of the one or more operations for signal processing or a threshold run time for each of the one or more operations for signal processing.

Aspect 58: The method of any of aspects 47 through 57, the transmitting the indication of the sequence of operations comprising: transmitting RRC signaling or a MAC-CE that comprises the indication of the sequence of operations.

Aspect 59: The method of any of aspects 47 through 58, further comprising: transmitting an indication of one or more data formats associated with one or more operations of the sequence of operations, the one or more data formats comprising an XML data format, a JSON data format, or any combination thereof.

Aspect 60: The method of any of aspects 47 through 59, wherein the device comprises a UE, a base station, a network entity, a relay device, a sidelink device, or an IAB node.

Aspect 61: An apparatus for wireless communication at a device in a wireless network, comprising a processor; memory coupled with the processor; and instructions stored in the memory and executable by the processor to cause the apparatus to perform a method of any of aspects 34 through 46.

Aspect 62: An apparatus for wireless communication at a device in a wireless network, comprising at least one means for performing a method of any of aspects 34 through 46.

Aspect 63: A non-transitory computer-readable medium storing code for wireless communication at a device in a wireless network, the code comprising instructions executable by a processor to perform a method of any of aspects 34 through 46.

Aspect 64: An apparatus for wireless communication at a base station, comprising a processor; memory coupled with the processor; and instructions stored in the memory and executable by the processor to cause the apparatus to perform a method of any of aspects 47 through 60.

Aspect 65: An apparatus for wireless communication at a base station, comprising at least one means for performing a method of any of aspects 47 through 60.

Aspect 66: A non-transitory computer-readable medium storing code for wireless communication at a base station, the code comprising instructions executable by a processor to perform a method of any of aspects 47 through 60.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a device in a wireless network, comprising:
one or more memories; and
one or more processors coupled with the one or more memories and configured to cause the device to:
obtain a configuration message for the device, wherein the configuration message indicates one or more neural network models for the device;
obtain signaling that comprises an indication of a temporal order of operations for a signal processing procedure for at least one neural network model of the one or more neural network models, wherein the signal processing procedure comprises one of an input pre-processing procedure associated with the at least one neural network model or an output post-processing procedure associated with the at least one neural network model; and
perform the signal processing procedure for the at least one neural network model using a signal obtained at the device according to the temporal order of operations.

2. The apparatus of claim 1, wherein the one or more processors are further configured to cause the device to:
obtain signaling that configures the device with a set of operations comprising one or more operations of the temporal order of operations for the at least one neural network model.

3. The apparatus of claim 1, wherein, to obtain the indication of the temporal order of operations, the one or more processors are configured to cause the device to:
obtain the indication of the temporal order of operations for the signal processing procedure in the configuration message, wherein the configuration message comprises a set of operations comprising all operations of the temporal order of operations for the at least one neural network model.

4. The apparatus of claim 1, wherein, to obtain the indication of the temporal order of operations, the one or more processors are configured to cause the device to:
obtain a second configuration message for the device, wherein the second configuration message indicates the at least one neural network model, the indication of the temporal order of operations, and a set of operations comprising all operations of the temporal order of operations for the at least one neural network model.

5. The apparatus of claim 1, wherein, to obtain the indication of the temporal order of operations, the one or more processors are configured to cause the device to:
obtain a set of input parameters, a set of output parameters, or both for one or more operations of the temporal order of operations for the at least one neural network model.

6. The apparatus of claim 1, wherein the one or more processors are further configured to cause the device to:
obtain an indication of a mapping between the one or more neural network models and a set of operating conditions, wherein the signal processing procedure for the at least one neural network model is performed using the signal obtained at the device according to the temporal order of operations based at least in part on the mapping between the one or more neural network models and the set of operating conditions.

7. The apparatus of claim 6, wherein the set of operating conditions comprises a signal-to-noise ratio range, a bandwidth range, a signal scaling range, a channel delay profile, a signal peak range, or any combination thereof, associated with the signal obtained at the device.

8. The apparatus of claim 1, wherein the one or more processors are further configured to cause the device to:
output a message that indicates a capability of the device to support one or more operations for one or more signal processing procedures, wherein the indication of the temporal order of operations for the signal processing procedure for the at least one neural network model is obtained based at least in part on the capability of the device.

9. The apparatus of claim 8, wherein the temporal order of operations comprises one or more operations supported by the device.

10. The apparatus of claim 8, wherein the message that indicates the capability of the device to support the one or more operations for the one or more signal processing procedures comprises an indication of a threshold input dimension for each of the one or more operations for the one or more signal processing procedures or a threshold run time for each of the one or more operations for the one or more signal processing procedures.

11. The apparatus of claim 1, wherein, to obtain the indication of the temporal order of operations, the one or more processors are configured to cause the device to:
obtain radio resource control (RRC) signaling or a medium access control (MAC) control element (MAC-CE) that comprises the indication of the temporal order of operations.

12. The apparatus of claim 1, further comprising:
an antenna configured to obtain an indication of one or more data formats associated with one or more operations of the temporal order of operations, wherein the one or more data formats comprise an extensible markup language data format, a JavaScript Object Notation data format, or any combination thereof.

13. The apparatus of claim 1, wherein the device comprises a user equipment (UE), a base station, a network entity, a relay device, a sidelink device, or an integrated access and backhaul (IAB) node.

14. An apparatus for wireless communication at a network entity, comprising:
one or more memories; and
one or more processors coupled with the one or more memories and configured to cause the network entity to:
output a configuration message to a device, wherein the configuration message indicates one or more neural network models for the device;
output signaling that comprises an indication of a temporal order of operations for a signal processing procedure for at least one neural network model of the one or more neural network models, wherein the signal processing procedure comprises one of an input pre-processing procedure associated with the at least one neural network model or an output post-processing procedure associated with the at least one neural network model; and
output a signal to the device based at least in part on the indication of the temporal order of operations for the signal processing procedure for the at least one neural network model.

15. The apparatus of claim 14, wherein the one or more processors are further configured to cause the network entity to:

output signaling that configures the device with a set of operations comprising one or more operations of the temporal order of operations for the at least one neural network model.

16. The apparatus of claim 14, wherein the one or more processors are further configured to cause the network entity to:

obtain a second temporal order of operations for a second signaling procedure performed at the network entity.

17. The apparatus of claim 14, wherein, to output the indication of the temporal order of operations, the one or more processors are configured to cause the network entity to:

output the indication of the temporal order of operations for the signal processing procedure in the configuration message, wherein the configuration message comprises a set of operations comprising all operations of the temporal order of operations for the at least one neural network model.

18. The apparatus of claim 14, wherein, to output the indication of the temporal order of operations, the one or more processors are configured to cause the network entity to:

output a second configuration message to the device, wherein the second configuration message indicates the at least one neural network model, the indication of the temporal order of operations, and a set of operations comprising all operations of the temporal order of operations for the at least one neural network model.

19. The apparatus of claim 14, wherein, to output the indication of the temporal order of operations, the one or more processors are configured to cause the network entity to:

output a set of input parameters, a set of output parameters, or both for one or more operations of the temporal order of operations for the at least one neural network model.

20. The apparatus of claim 14, wherein the one or more processors are further configured to cause the network entity to:

output an indication of a mapping between the one or more neural network models and a set of operating conditions.

21. The apparatus of claim 20, wherein the set of operating conditions comprises a signal-to-noise ratio range, a bandwidth range, a signal scaling range, a channel delay profile, a signal peak range, or any combination thereof, associated with the signal transmitted to the device.

22. The apparatus of claim 14, wherein the one or more processors are further configured to cause the network entity to:

obtain a message that indicates a capability of the device to support one or more operations for one or more signal processing procedures, wherein the indication of the temporal order of operations for the signal processing procedure for the at least one neural network model is obtained based at least in part on the capability of the device.

23. The apparatus of claim 22, wherein the temporal order of operations comprises one or more operations supported by the device.

24. The apparatus of claim 22, wherein the message that indicates the capability of the device to support the one or more operations for the one or more signal processing procedures comprises an indication of a threshold input dimension for each of the one or more operations for the one or more signal processing procedures or a threshold run time for each of the one or more operations for the one or more signal processing procedures.

25. The apparatus of claim 14, wherein, to output the indication of the temporal order of operations, the one or more processors are configured to cause the network entity to:

output radio resource control (RRC) signaling or a medium access control (MAC) control element (MAC-CE) that comprises the indication of the temporal order of operations.

26. The apparatus of claim 14, further comprising:

an antenna configured to output an indication of one or more data formats associated with one or more operations of the temporal order of operations, wherein the one or more data formats comprise an extensible markup language data format, a JavaScript Object Notation data format, or any combination thereof.

27. The apparatus of claim 14, wherein the device comprises a user equipment (UE), a base station, a network entity, a relay device, a sidelink device, or an integrated access and backhaul (IAB) node.

28. A method for wireless communication at a device in a wireless network, comprising:

obtaining a configuration message for the device, the configuration message indicating one or more neural network models for the device;

obtaining signaling that comprises an indication of a temporal order of operations for a signal processing procedure for at least one neural network model of the one or more neural network models, the signal processing procedure comprising one of an input pre-processing procedure associated with the at least one neural network model or an output post-processing procedure associated with the at least one neural network model; and performing the signal processing procedure for the at least one neural network model using a signal obtained at the device according to the temporal order of operations.

29. The method of claim 28, further comprising:

obtaining signaling configuring the device with a set of operations comprising one or more operations of the temporal order of operations for the at least one neural network model.

30. A method for wireless communication at a network entity, comprising:

outputting a configuration message to a device, the configuration message indicating one or more neural network models for the device;

outputting signaling that comprises an indication of a temporal order of operations for a signal processing procedure for at least one neural network model of the one or more neural network models, the signal processing procedure comprising one of an input pre-processing procedure associated with the at least one neural network model or an output post-processing procedure associated with the at least one neural network model; and outputting a signal to the device based at least in part on the indication of the temporal order of operations for the signal processing procedure for the at least one neural network model.

31. The method of claim 30, further comprising: outputting signaling configuring the device with a set of operations comprising one or more operations of the temporal order of operations for the at least one neural network model.

32. The method of claim 30, wherein outputting the indication of the temporal order of operations comprises: outputting the indication of the temporal order of operations for the signal processing procedure in the configuration message, wherein the configuration message comprises a set of operations comprising all operations of the temporal order of operations for the at least one neural network model.

33. The method of claim 30, wherein outputting the indication of the temporal order of operations comprises: outputting a second configuration message to the device, the second configuration message indicating the at least one neural network model, the indication of the temporal order of operations, and a set of operations comprising all operations of the temporal order of operations for the at least one neural network model.

34. The method of claim 30, wherein outputting the indication of the temporal order of operations comprises: outputting a set of input parameters, a set of output parameters, or both for one or more operations of the temporal order of operations for the at least one neural network model.

35. The method of claim 30, wherein outputting the indication of the temporal order of operations comprises: outputting radio resource control (RRC) signaling or a medium access control (MAC) control element (MAC-CE) comprising the indication of the temporal order of operations.

36. The method of claim 28, wherein obtaining the indication of the temporal order of operations comprises: obtaining the indication of the temporal order of operations for the signal processing procedure in the configuration message, wherein the configuration message comprises a set of operations comprising all operations of the temporal order of operations for the at least one neural network model.

37. The method of claim 28, wherein obtaining the indication of the temporal order of operations comprises: obtaining a second configuration message for the device, the second configuration message indicating the at least one neural network model, the indication of the temporal order of operations, and a set of operations comprising all operations of the temporal order of operations for the at least one neural network model.

38. The method of claim 28, wherein obtaining the indication of the temporal order of operations comprises: obtaining a set of input parameters, a set of output parameters, or both for one or more operations of the temporal order of operations for the at least one neural network model.

39. The method of claim 28, further comprising: obtaining an indication of a mapping between the one or more neural network models and a set of operating conditions, the signal processing procedure for the at least one neural network model being performed using the signal obtained at the device according to the temporal order of operations based at least in part on the mapping between the one or more neural network models and the set of operating conditions.

40. The method of claim 28, wherein obtaining the indication of the temporal order of operations comprises: obtaining radio resource control (RRC) signaling or a medium access control (MAC) control element (MAC-CE) comprising the indication of the temporal order of operations.

41. A non-transitory computer-readable medium storing code for wireless communication at a device, the code comprising instructions executable by one or more processors to cause the device to:

obtain a configuration message for the device, wherein the configuration message indicates one or more neural network models for the device;

obtain signaling that comprises an indication of a temporal order of operations for a signal processing procedure for at least one neural network model of the one or more neural network models, wherein the signal processing procedure comprises one of an input pre-processing procedure associated with the at least one neural network model or an output post-processing procedure associated with the at least one neural network model; and perform the signal processing procedure for the at least one neural network model using a signal obtained at the device according to the temporal order of operations.

42. A non-transitory computer-readable medium storing code for wireless communication at a network entity, the code comprising instructions executable by one or more processors to cause the network entity to:

output a configuration message to a device, wherein the configuration message indicates one or more neural network models for the device;

output signaling that comprises an indication of a temporal order of operations for a signal processing procedure for at least one neural network model of the one or more neural network models, wherein the signal processing procedure comprises one of an input pre-processing procedure associated with the at least one neural network model or an output post-processing procedure associated with the at least one neural network model; and output a signal to the device based at least in part on the indication of the temporal order of operations for the signal processing procedure for the at least one neural network model.

* * * * *